(12) United States Patent
Shimazawa et al.

(10) Patent No.: US 8,240,025 B2
(45) Date of Patent: Aug. 14, 2012

(54) METHOD FOR MANUFACTURING HEAD INCLUDING LIGHT SOURCE UNIT FOR THERMAL ASSIST

(75) Inventors: Koji Shimazawa, Tokyo (JP); Seiichi Takayama, Tokyo (JP); Nobuyuki Mori, Tokyo (JP); Yoshihiro Tsuchiya, Tokyo (JP); Shinji Hara, Tokyo (JP)

(73) Assignee: TDK Corporation, Tokyo (JP)

( * ) Notice: Subject to any disclaimer, the term of this patent is extended or adjusted under 35 U.S.C. 154(b) by 91 days.

(21) Appl. No.: 12/888,916

(22) Filed: Sep. 23, 2010

(65) Prior Publication Data

US 2012/0073120 A1 Mar. 29, 2012

(51) Int. Cl.
*G11B 5/127* (2006.01)
*H04R 31/00* (2006.01)

(52) U.S. Cl. ............ 29/603.14; 29/603.15; 29/603.16; 29/603.18; 29/737; 360/317; 360/319; 360/321; 428/811.5; 428/815; 428/816

(58) Field of Classification Search ............ 29/603.07, 29/603.13–603.18, 603.2, 603.22; 360/317, 360/319–321; 428/811.5, 815, 816
See application file for complete search history.

(56) References Cited

U.S. PATENT DOCUMENTS

| | | | |
|---|---|---|---|
| 6,741,524 B2 * | 5/2004 | Ichihara et al. | ............ 369/13.01 |
| 7,538,978 B2 | 5/2009 | Sato et al. | |
| 7,710,677 B2 * | 5/2010 | Tanaka et al. | .................. 360/59 |
| 7,876,646 B2 * | 1/2011 | Tanaka et al. | ............. 369/13.02 |
| 7,940,486 B2 * | 5/2011 | Shimazawa et al. | ............ 360/59 |
| 2008/0002298 A1 | 1/2008 | Sluzewski | |
| 2008/0043360 A1 | 2/2008 | Shimazawa et al. | |
| 2008/0056073 A1 | 3/2008 | Shimizu | |
| 2009/0052078 A1 | 2/2009 | Tanaka et al. | |

FOREIGN PATENT DOCUMENTS

| | | |
|---|---|---|
| JP | A-2006-260698 | 9/2006 |
| JP | A-2007-26551 | 2/2007 |

OTHER PUBLICATIONS

U.S. Appl. No. 12/726,981, filed Mar. 18, 2010.

* cited by examiner

*Primary Examiner* — Paul D Kim
(74) *Attorney, Agent, or Firm* — Oliff & Berridge, PLC

(57) ABSTRACT

Provided is a method and apparatus to manufacture a thermally-assisted magnetic recording head in which a light source unit including a light source and a slider including an optical system are joined. The method comprises steps of: adhering by suction the light source unit with a back holding jig; bringing the light into contact with a slider back surface; applying a load to a load application surface of the light source unit by a loading means to bring a joining surface of the light source unit into conformity with the slider back surface; positioning the light source unit apart from the slider, and then aligning the light source with the optical system; bringing again the light source unit into contact with the slider; and applying a load again to the load application surface.

11 Claims, 12 Drawing Sheets

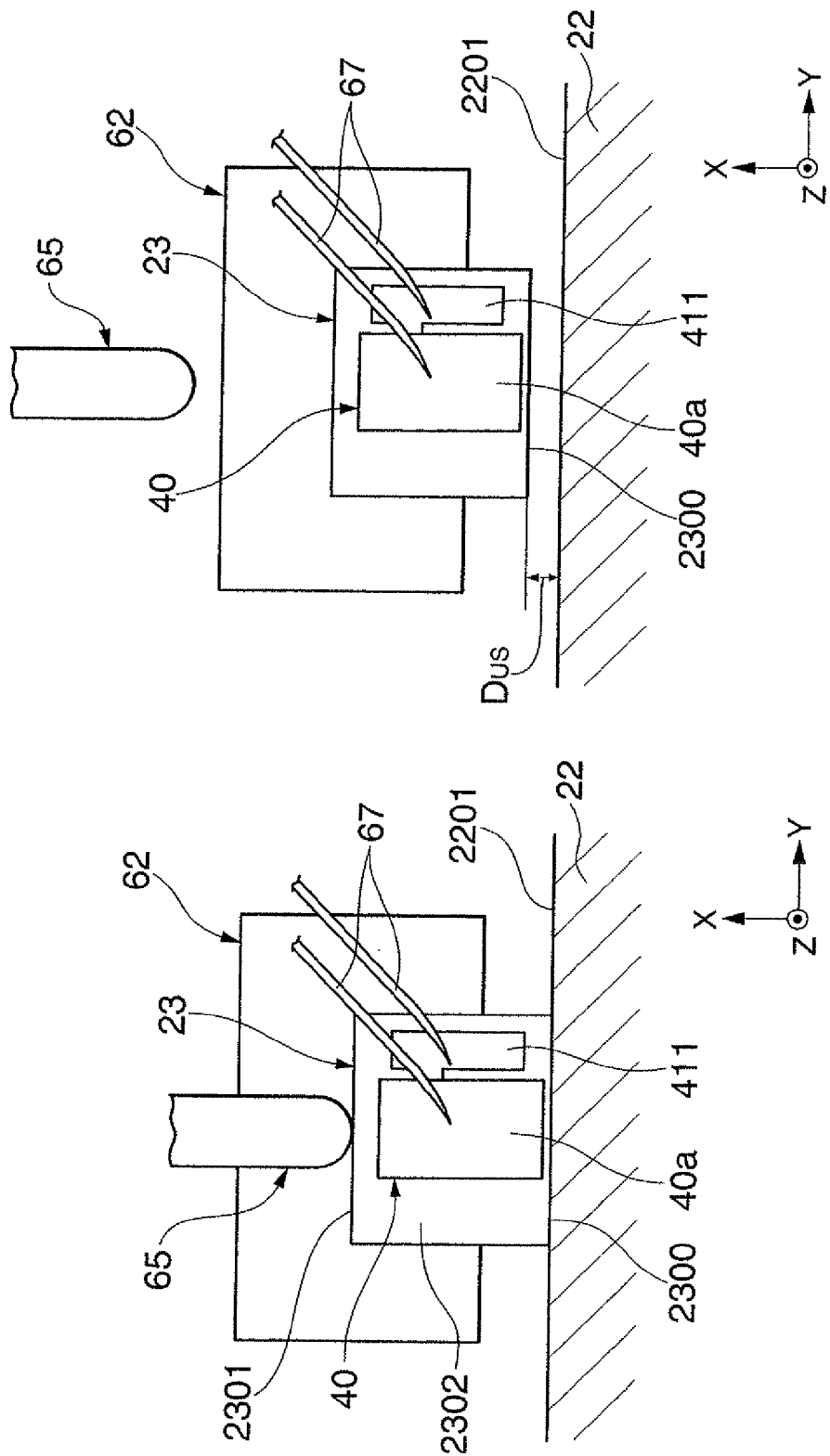

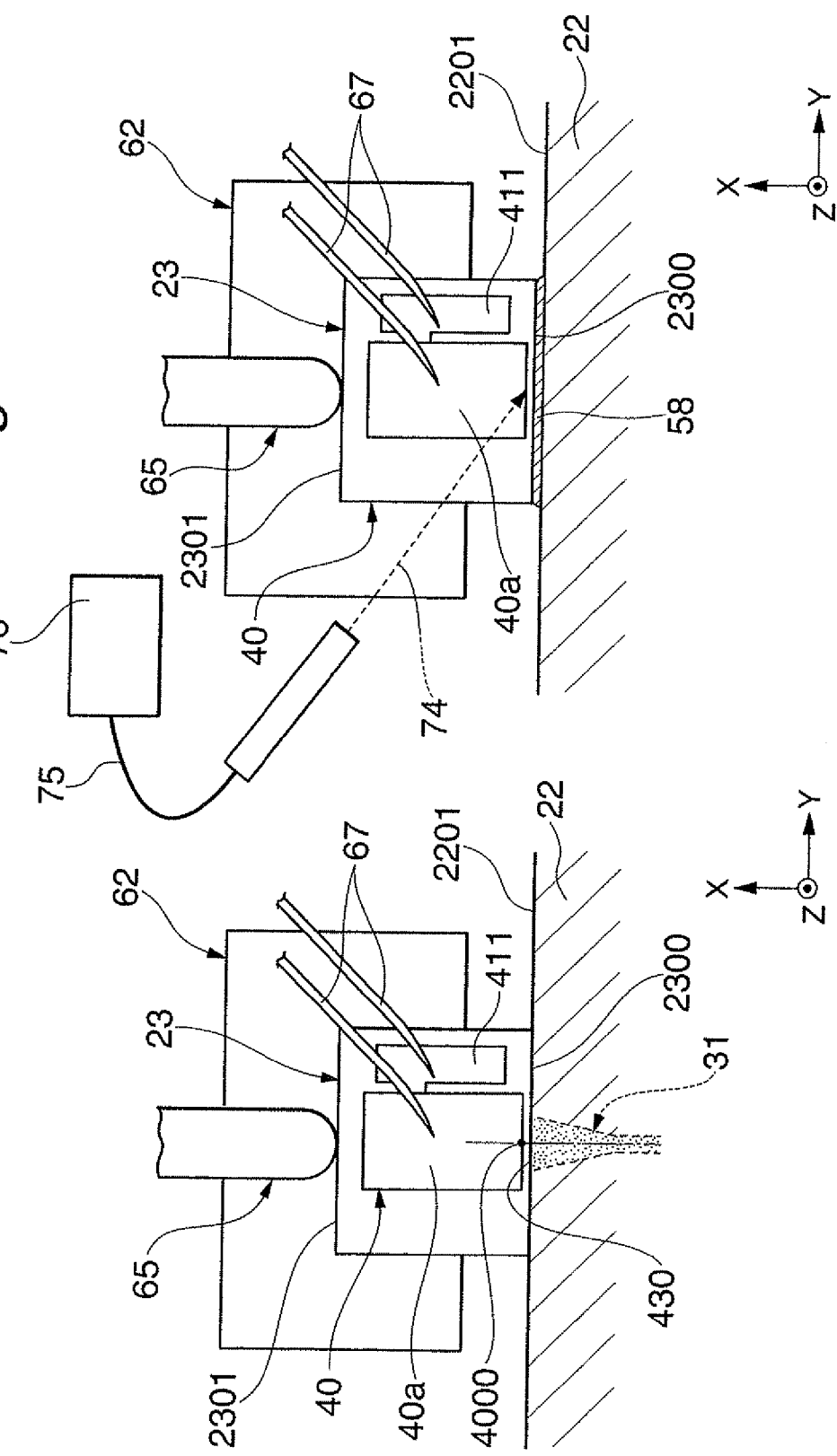

METHOD FOR MANUFACTURING HEAD INCLUDING LIGHT SOURCE UNIT FOR THERMAL ASSIST

BACKGROUND OF THE INVENTION

1. Field of the Invention

The present invention relates to a method for manufacturing a thermally-assisted magnetic recording head used for thermally-assisted magnetic recording in which a portion to be written of a magnetic recording medium is heated and thus writing is performed to the portion where anisotropic magnetic field decreases. The present invention especially relates to a method for manufacturing a thermally-assisted magnetic recording head constituted by joining a light source unit and a slider. The present invention further relates to an apparatus used for the joining.

2. Description of the Related Art

With the explosion in the use of the Internet in these years, more data than ever before is stored and used on computers such as servers and information processing terminals. This trend is expected to further grow at an accelerated rate. Under these circumstances, demand for magnetic recording apparatuses such as magnetic disk apparatuses as mass storage is growing, and the demand for higher recording densities of the magnetic recording apparatuses is also escalating.

In the magnetic recording technology, it is necessary for magnetic heads to write smaller recording bits on magnetic recording media in order to achieve higher recording densities. In order to stably form smaller recording bits, perpendicular magnetic recording technology has been commercially implemented in which components of magnetization perpendicular to the surface of a medium are used as recording bits. In addition, thermally-assisted magnetic recording technology that enables the use of magnetic recording media having higher thermal stability of magnetization is being actively developed.

In the thermally-assisted magnetic recording technology, a magnetic recording medium formed of a magnetic material with a large energy $K_U$ is used so as to stabilize the magnetization, then anisotropic magnetic field of a portion of the medium, where data is to be written, is reduced by heating the portion; just after that, writing is performed by applying write field to the heated portion. Actually, there has been generally used a method in which a magnetic recording medium is irradiated and thus heated with a light such as near-field light (NF-light). In this case, it is significantly important where and how a light source with a sufficiently high light output should be disposed inside a head in order to stably supply a light with a sufficiently high intensity at a desired position on the magnetic recording medium.

As for the setting of the light source, for example, U.S. Pat. No. 7,538,978 B2 discloses a configuration in which a laser unit including a laser diode is mounted on the back surface of a slider, and US Patent Publication No. 2008/0056073 A1 discloses a configuration in which a structure of a laser diode element with a monolithically integrated reflection mirror is mounted on the back surface of a slider.

The present inventors propose a thermally-assisted magnetic recording head with a "composite slider structure" which is constituted by joining a light source unit provided with a light source to the end surface (back surface) of a slider provided with a write head element, the end surface being opposite to the opposed-to-medium surface of the slider. The "composite slider structure" is disclosed in, for example, US Patent Publication No. 2008/043360 A1 and US Patent Publication No. 2009/052078 A1. The advantages of the thermally-assisted magnetic recording head with the "composite slider structure" are as follows:

a) The head has an affinity with the conventional manufacturing method of thin-film magnetic heads because the opposed-to-medium surface and the element-integration surface are perpendicular to each other in the slider.

b) The light source can avoid suffering mechanical shock directly during operation because the light source is provided far from the opposed-to-medium surface.

c) The light source such as a laser diode and the head elements can be evaluated independently of each other; thus the degradation of manufacturing yield for obtaining the whole head can be avoided; whereas, in the case that all the light source and head elements are provided within the slider, the manufacturing yield rate for obtaining the whole head is likely to decrease significantly due to the multiplication of the process yield for the light-source and the process yield for the head elements.

d) The head can be manufactured with reduced labor and at a low cost, because there is no need to provide the head with optical components such as a lens or prism which are required to have much high accuracy, or with optical elements having a special structure for connecting optical fibers or the like.

It is important to appropriately join a light source unit to a slider in fabricating the thermally-assisted magnetic recording head having the "composite slider structure". Specifically, it is essential to provide a sufficiently strong junction, to provide a heat dissipation path for the light source after the joining, and to ensure a sufficiently high accuracy of joining position.

A sufficiently strong junction can be provided by using metal solder to join the light source unit and the slider. In this case, the light source unit and the slider sandwich the metal solder therebetween. This arrangement can provide a heat dissipation path along which heat radiated from the light source is transferred sequentially to the unit substrate, the metal solder, the slider substrate, and a magnetic recording medium during write operations of the head flying above the magnetic recording medium.

When metal solder is used for the joining, the layer of the metal solder needs to be formed to an appropriate thickness, for example a thickness in the range of approximately 0.05 to 2 µm (micrometers). If the solder is too thin, it is difficult to provide sufficient joining strength. On the other hand, if the solder is too thick, the distance between the light source unit and the slider will be so large that light emitted from the light source significantly attenuates before reaching an optical system in the slider, possibly resulting in a significantly reduced light use efficiency of the head. In addition, solder can flow into the space between the light source and the optical system.

When solder with such limitations of thickness is used to join the light source unit and the slider, it is important to provide extremely high "conformity" between the joining surfaces of the light source unit and the slider. The term "conformity" as used here means the degree of parallelism of a surface to a reference surface, or the degree to which a surface conforms to a reference surface. Suppose that the joining surface of a light source unit that is 500 µm wide in the track width direction is to be joined to the joining surface of a slider that is well wider than the joining surface of the light source unit. If alignment conducted before joining is completed with the joining surface of the light source unit being tilted at a small angle of 0.5° (degree) to the joining surface of the slider and then the solder is melted to complete the joining, one end of the joining surface of the light source unit will be at a distance of at least approximately 4.4 µm apart from the joining surface of the slider. Even if the solder is 2 µm thick, a gap will be formed between the joining surfaces and the strength of the joining can be unacceptably reduced. If the joining is weak, the light source unit can become detached from the slider during a subsequent process step such as a cleaning step, or during use of the head.

A sufficiently high accuracy of joining position between the light source unit and the slider can be achieved by active alignment. Here, the active alignment is a method in which a light source such as a laser diode is actually put into operation and, while the light source and an optical system such as a waveguide are moved relatively to each other, light emitted from the light source and incident on the light-receiving end of the optical system is monitored on the light-emitting end side of the optical system in real time until the light intensity in the monitoring location is maximized, then the maximum intensity position is set as the desired relative position of the light source with respect to the optical system. The active alignment requires that electric power be supplied to the light source of the light source unit by pressing probes against electrodes for the light source while the light source unit is being moved above the slider. There is a method for meeting the requirement in which the light source is held with a clamp in such a manner that the surface of the light source unit on which the electrodes are formed is not covered with the clamp, and the clamp holding the light source unit is moved above a stage on which the slider is placed to align the light source unit to the slider.

However, it is difficult to sufficiently increase the conformity between the joining surfaces of the light source unit and the slider by this method of moving the light source. In fact, the surfaces of the unit substrate of the light source unit has errors in squareness in relation to each other due to working accuracy limitations. In addition, the surfaces of the clamp that holds the light source unit also has errors and the movement of clamp with respect to the stage also has an error due to adjustment limitations. Therefore, even when the clamp is moved closer to the stage to bring the light source unit into contact with the slider, it is significantly difficult to achieve high conformity between the joining surfaces of the light source unit and the slider. If a conformity adjustment mechanism such as an air gimbal is provided in the stage in order to address the conformity problem, the mechanism will have little effect in adjusting conformity because the size of the slider placed on the stage is very small. The mechanism also adds complexity to the joining apparatus.

As will be appreciated from the foregoing, there is a long felt need for a method capable of achieving an extremely high "conformity" between the joining surfaces of the light source unit and the slider in joining between the light source unit and the slider after aligning the light source unit and the slider with each other by active alignment.

SUMMARY OF THE INVENTION

Some terms used in the specification will be defined before explaining the present invention. In a layered structure or an element structure formed in the element-integration surface of a slider substrate or in the source-installation surface of a unit substrate of the magnetic recording head according to the present invention, when viewed from a standard layer or element, a substrate side is defined as a "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to a trailing side and −Z side to a leading side. And Y-axis direction indicates a track width direction, and X-axis direction indicates a height direction.

According to the present invention, provided is a method for manufacturing a thermally-assisted magnetic recording head in which a light source unit including a light source provided in a unit substrate and a slider including an optical system provided in a slider substrate are joined to each other. The manufacturing method comprises the steps of:

adhering by suction a unit back surface of the unit substrate with a back holding jig including a suction means, the unit back surface being opposite to a source-installation surface of the unit substrate;

moving the back holding jig close to the slider to bring the light source unit adhered to the back holding jig by suction into contact with a slider back surface of the slider, the slider back surface being opposite to an opposed-to-medium surface of the slider and including a light-receiving end surface of the optical system;

applying a load to a load application surface of the unit substrate by a loading means to bring a joining surface of the light source unit into conformity with the slider back surface of the slider at least in a track width direction, the load application surface being opposite to the joining surface that is to be joined to the slider;

stopping applying the load, moving the back holding jig away from the slider to position the light source unit at a distance from the slider, and then aligning a light-emitting center of the light source with the light-receiving end surface of the optical system in directions in a plane of the slider back surface;

moving the back holding jig again close to the slider to bring the light source unit into contact with the slider back surface of the slider; and applying a load again to the load application surface of the unit substrate by the loading means to bring the joining surface of the light source unit into conformity with the slider back surface of the slider.

In the manufacturing method, it is preferable that probes are brought into contact with electrodes for the light source provided in the light source unit, electric power is supplied to the light source to put the light source in emitting operation, and then the light-emitting center of the light source is aligned with the light-receiving end surface of the optical system so that a light from the light source enters the optical system.

In the above-described manufacturing method, the "conformity" between the joining surface of the light source unit and the slider back surface of the slider can be significantly increased while the light source unit and the slider can be aligned with each other by active alignment in which the light source is actually put in emitting operation. Accordingly, an adequately strong junction and an adequately high accuracy of the joining position can be achieved in the joining between the light source unit and the slider. Here, the active alignment is a method in which a light source is actually put into operation and, while the light source and an optical system such as a waveguide are moved relatively to each other, light emitted from the light source and incident on the light-receiving end of the optical system is monitored on the light-emitting end side of the optical system in real time until the light intensity in the monitoring location is maximized, then the maximum intensity position is set as the desired relative position of the light source with respect to the optical system. Further, the term "conformity" as used here means the degree of parallelism of a surface to a reference surface, or the degree to which a surface conforms to a reference surface.

Further, in the method for manufacturing the thermally-assisted magnetic recording head according to the present invention, it is preferable that a suction force of the suction means provided in the back holding jig, with which the light source unit is sucked, has a magnitude such that a position or orientation of the light source unit is changed under a predetermined load applied. Furthermore, it is preferable that the suction means included in the back holding jig is at least one suction hole provided in the back holding jig, and the light source unit is adhered by suction to the back holding jig by activating an evacuator connected to one end of the at least one suction hole. Moreover, it is preferable that the loading means is a jig having a spherical or convex portion which is to contact with the load application surface of the unit substrate.

Further, in the method for manufacturing the thermally-assisted magnetic recording head according to a preferred embodiment, the manufacturing method preferably further comprises the steps of: forming an adhesion material layer previously on the joining surface of the light source unit or the slider back surface of the slider or on both of the surfaces, and bringing the joining surface into conformity with the slider back surface with the adhesion material layer sandwiched therebetween; irradiating the adhesion material layer with a light that includes a wavelength that passes through the unit substrate through the unit substrate to melt the adhesion material layer; and bonding the light source unit and the slider. In this case, by forming the unit substrate of a semiconductor material such as Si, GaAs or SiC and by irradiating the adhesion material layer with Nd-YAG laser light through the unit substrate and thus melting the adhesion material layer, the light source unit and the slider can be joined.

According to a preferred embodiment, a joining apparatus used for conducting the above-described manufacturing method is further provided, which comprises:

a fixture for supporting the slider;

a back holding jig comprising: a suction means for adhering the light source unit by suction; and a suction surface that is to contact with the unit back surface of the unit substrate, the back holding jig being capable of moving to adjust relative position of the light source unit with respect to the slider held in the fixture;

a loading means for applying a load to the load application surface of the unit substrate;

probes to be pressed against electrodes for the light source provided in the light source unit, provided for supplying electric power to the light source in order to align a light-emitting center of the light source with the light-receiving end surface of the optical system in directions in a plane of the slider back surface; and a controller configured to control movement of the back holding jig, suction by the suction means, application of load by the loading means, movement of the probes, and power supply to the light source through the probes, as appropriate.

In the joining apparatus according to a preferred embodiment, the joining apparatus preferably further comprises a photodetector for detecting a light that is emitted from the light source to which electric power is applied through the probes, propagated through the optical system, and emitted from the opposed-to-medium surface of the slider when aligning the light-emitting center of the light source with the light-receiving end surface of the optical system. Furthermore, it is preferable that the joining apparatus further comprises a light source for adhesion for irradiating an adhesion material layer with a light that includes a wavelength that passes through the unit substrate through the unit substrate, in order to melt the adhesion material layer and thus to bond the light source unit and the slider after forming the adhesion material layer previously on the joining surface of the light source unit or the slider back surface of the slider or on both of the surfaces and bringing the joining surface into conformity with the slider back surface with the adhesion material layer sandwiched therebetween.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIGS. 7a1 to 7j show schematic views illustrating one embodiment of the method for manufacturing the thermally-assisted magnetic recording head in which a light source unit is joined to a slider according to the present invention;

DESCRIPTION OF THE PREFERRED EMBODIMENTS

Figure 1:
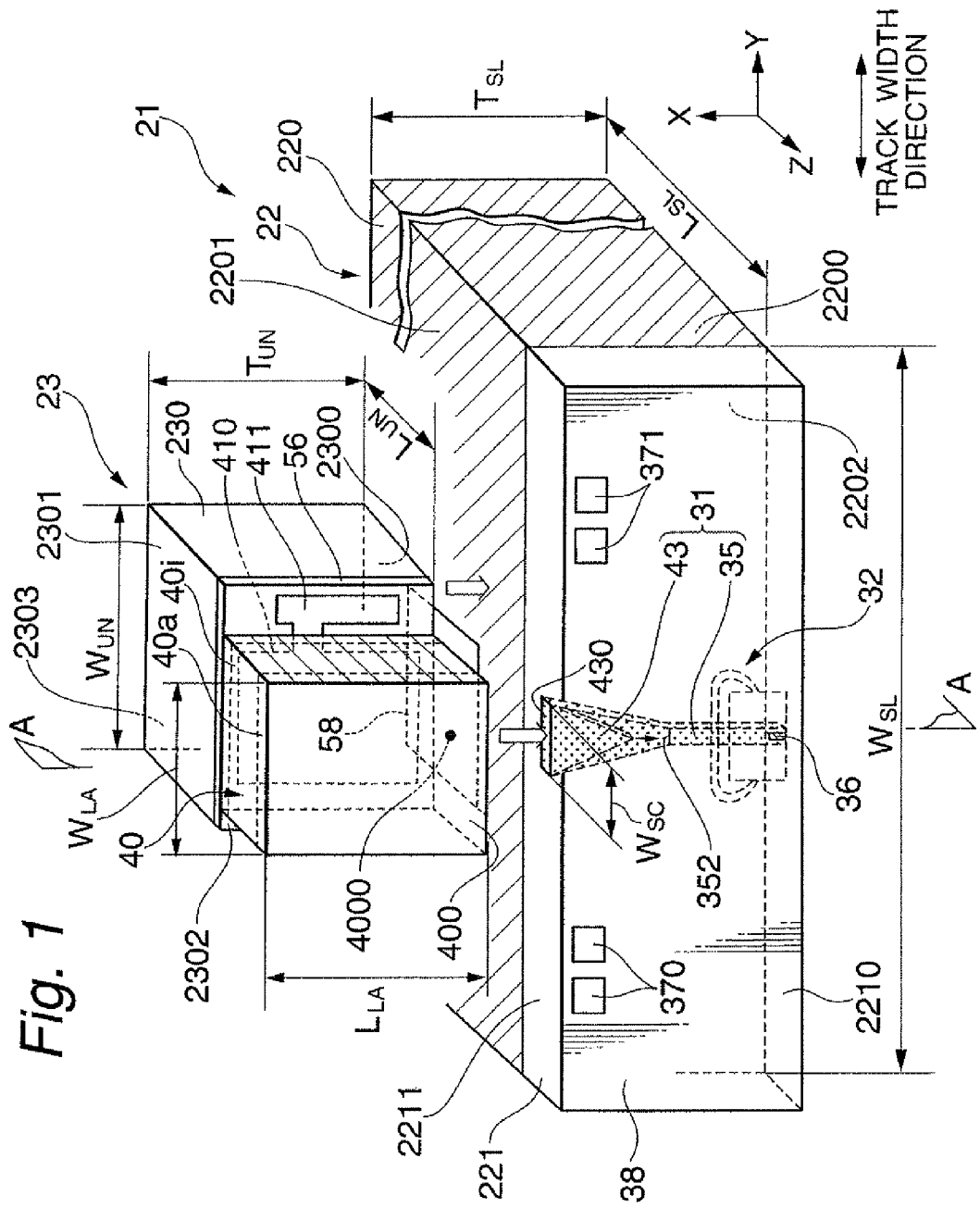
FIG. 1 shows a perspective view illustrating one embodiment of a thermally-assisted magnetic recording head manufactured by a manufacturing method according to the present invention.

FIG. 1 shows a perspective view illustrating one embodiment of a thermally-assisted magnetic recording head manufactured by a manufacturing method according to a preferred embodiment of the present invention.

As shown in FIG. 1, a thermally-assisted magnetic recording head 21 is fabricated by aligning and joining a light source unit 23, which includes a laser diode 40 as a light source for thermal assist, and a slider 22, which includes an optical system 31.

The slider 22 includes: a slider substrate 220 having an air bearing surface (ABS) 2200 processed so as to provide an appropriate flying height; and a head element part 221 that includes an optical system 31 and is formed on an element-integration surface 2202 that is perpendicular to and adjacent to the ABS 2200. While, the light source unit 23 includes: a unit substrate 230 having an joining surface 2300; and a laser diode 40 as a light source provided on a source-installation surface 2302 that is perpendicular to and adjacent to the joining surface 2300.

These slider 22 and light source unit 23 are bonded to each other in such a way that a slider back surface 2201 of the slider substrate 220 on the side opposite to the ABS 2200 and a joining surface 2300 of the unit substrate 230 are opposed to each other and sandwich a solder layer 58 as an adhesion material layer therebetween.

(Light Source Unit)

In the light source unit 23 as also shown in FIG. 1, the laser diode 40 can be a semiconductor diode of edge-emitting type. The laser diode 40 has a light-emission center 4000 from which laser light for thermal assist is emitted. The laser diode 40 is provided in the source-installation surface 2302 of the unit substrate 230 in such a way that the light-emission center 4000 is opposed to the light-receiving surface 430 of the optical system 31. The laser diode 40 is preferably bonded to the unit substrate 230 with a p-electrode layer 40i (FIG. 2) down (so that the p-electrode layer 40i faces the source-installation surface 2302). In edge-emitting laser diodes in general, an active layer (light-emission center) and its vicinity where most amount of heat is generated lie closer to the p-electrode. Therefore, by setting the p-electrode 40i as a bottom, the active layer becomes closer to the unit substrate 230 and the unit substrate 230 can more effectively function as a heatsink of the light source. As a result, there can be provided a heat dissipation path along which heat radiated from the laser diode 40 is transferred sequentially to the unit substrate 230, the solder layer 58, the slider substrate 220, and a magnetic recording medium during write operations of the head 21.

Figure 2:
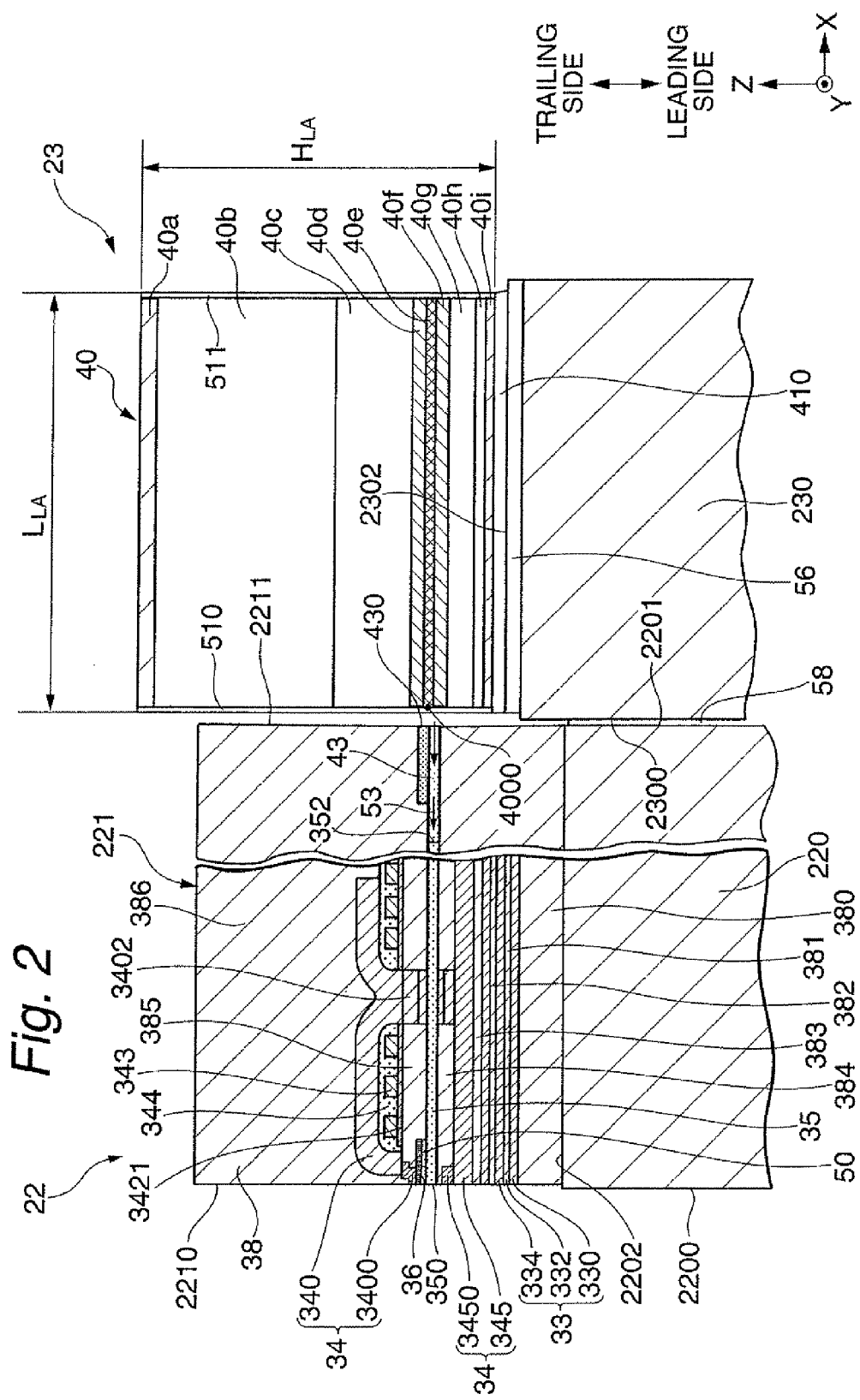
FIG. 2 shows a cross-sectional view taken by plane A in FIG. 1, schematically illustrating the structures of the head element part of the slider, the laser diode of the light source unit, and their vicinities in the thermally-assisted magnetic recording head.

In this case of setting the laser diode 40 with the p-electrode 40i as a bottom, the upper surface of the laser diode 40 is a surface of an n-electrode 40a (FIG. 2). The n-electrode 40a is an electrode with which a probe 67 is brought into contact in active alignment explained in detail later with reference to FIG. 7g.

Referring again to FIG. 1, a light source electrode 410 and a lead electrode 411 are provided in a source-installation surface 2302 of the light source unit 23. The light source electrode 410 is to be directly electrically connected to a p-electrode 40i (FIG. 2) of the laser diode 40. The lead electrode 411 is led from the light source electrode 410. A probe 67 will also be placed in contact with the lead electrode 411 during active alignment, which will be described later in detail with reference to FIG. 7g. The lead electrode 411 and an n-electrode 40a of the laser diode 40 will be electrically connected to connection pads of a wiring member 203 of a head gimbal assembly (HGA) 17 (FIG. 9) by a method such as wire bonding or solder ball bonding (SBB) after the light source unit 23 is joined to the slider 22. The electrical connections enable power supply to the laser diode 40.

Preferably, an insulation layer 56 of an insulating material such as $Al_2O_3$ (alumina) or $SiO_2$ is provided on the source-installation surface 2302, and on the insulation layer 56, the light source electrode 410 and the lead electrode 411 are provided, thereby electrically insulating the light source electrode 410 and the lead electrode 411 from the unit substrate 230. The light source electrode 410 and the lead electrode 411 may include a foundation layer made of a material such as Ta or Ti and having a thickness of approximately 10 nm (nanometers), for example, and a conductor layer of a conductive material such as Au, Cu or an Au alloy formed on the foundation layer with a thickness in the range of approximately 1 to 5 μm (micrometers), for example.

Referring also to FIG. 1, the unit substrate 230 is preferably made of a ceramic material such as AlTiC ($Al_2O_3$—TiC) or $SiO_2$ or made of a semiconductor material such as Si, GaAs or SiC. In the case that the unit substrate 230 is made of such a semiconductor material, the solder layer 58 can be melted by irradiation with light such as Nd-YAG laser light propagating through the unit substrate 230, thereby bonding the light source unit 23 and the slider 22.

Further, the unit substrate 230 is somewhat smaller than the slider substrate 220. However, the width W of the unit substrate 230 in the track width direction (Y-axis direction) is larger than the width $W_{LA}$ of the laser diode 40 in the track width direction (Y-axis direction), so that the lead electrode 411 is exposed in the source-installation surface 2302 even after the laser diode 40 is mounted on the light-source electrode 410. In the case of using a Femto slider as the slider substrate 220, for example, the unit substrate 230 may have a thickness $T_{UN}$ (in X-axis direction) of 350 μm, a width $W_{UN}$ in the track width direction of 500 μm, and a length $L_{UN}$ (in Z-axis direction) of 300 μm.

The surface 2303 of the unit substrate 230 that is opposite to the source-installation surface 2302 is to be brought into contact with a suction surface 620 of a back holding jig 62 that holds the light source unit 23, and to be adhered by suction to the suction surface 620, as will be described later in detail with reference to FIG. 7a2. The surface 2303 will be hereinafter referred to as unit back surface 2303. The surface 2301 of the unit substrate 230 that is opposite to the joining surface 2300 is a surface against which a round-tipped rod 65 is to be pressed in order to apply a load to the light source unit 23 to increase the "conformity" of the joining surface 2300, as will be detailed later with reference to FIG. 7d. The surface 2301 will be hereinafter referred to as load application surface 2301. The term "conformity" as used herein means the degree of parallelism of a surface to a reference surface, or the degree to which a surface conforms to a reference surface.

(Slider)

In the slider 22 as also shown in FIG. 1, the head element part 221 formed on the element-integration surface 2202 includes: a head element 32 constituted of a magnetoresistive (MR) element 33 for reading data from the magnetic disk 10 (FIG. 8) and an electromagnetic transducer 34 for writing data to the magnetic disk 10; a spot-size converter 43 that receives a laser light emitted from the laser diode 40, changes (reduces) the spot size of the laser light, then guides the laser light into the waveguide 35; a waveguide 35 that guides the laser light with changed spot size to the head end surface 2210 as an opposed-to-medium surface or its vicinity; a near-field light (NF-light) generator 36 that generates NF-light for thermal assist by coupling with the laser light propagating the waveguide 35; and an overcoat layer 38 formed on the element-integration surface 2202 so as to cover the head element 32, the spot-size converter 43, the waveguide 35 and the NF-light generator 36. Here, the spot-size converter 43, the waveguide 35 and the NF-light generator 36 constitute the optical system 31 for generating NF-light in the head 21 (head element part 221). The spot-size converter 43 and waveguide 35 are covered with the overcoat layer 38, and functions as a core in light propagation, whereas the portion of overcoat layer 38 that covers them functions as a clad.

One ends of the MR element 33, the electromagnetic transducer 34 and the NF-light generator 36 reach the head end surface 2210 as an opposed-to-medium surface. Here, the head end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk 10 with a predetermined flying height. Thus, the ends of the MR element 33 and electromagnetic transducer 34 face the surface of the magnetic record layer of the magnetic disk 10 with a appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the spot-size converter 43 and the waveguide 35, is changed into NF-light NF (FIG. 3) in the NF-light generator 36. Then, a portion to be written of the magnetic recording layer is irradiated and thus heated with the NF-light 62. As a result, the anisotropic magnetic field (coercive force) of the portion is decreased to a value that enables writing; thus the thermally-assisted magnetic recording can be achieved by applying write field WF (FIG. 3) with use of the electromagnetic transducer 34 to the anisotropic-field-decreased portion.

Referring also to FIG. 1, the spot-size converter 43 is an optical element which receives laser light emitted from the laser diode 40 at its light-receiving end surface 430 having a width $W_{SC}$ in the track width direction (Y-axis direction), converts the laser light to laser light having a smaller spot diameter with a lower loss, and then guides the converted laser light to a light-receiving end surface 352 of the waveguide 35. The spot-size converter 43 in the present embodiment includes a lower propagation layer and an upper propagation layer. The lower propagation layer has a width in the track width direction (Y-axis direction) that gradually decreases from the width $W_{SC}$ along the traveling direction (—X direction) of laser light incident through the light-receiving end surface 430. The upper propagation layer has a width in the track width direction (Y-axis direction) that more steeply decreases from the width $W_{SC}$ along the traveling direction (—X direction) of laser light than the lower propagation layer 431. Laser light incident through the light-receiving end surface 430 is converted to laser light with a smaller spot size as the laser light propagates through the layered structure, and reaches the light-receiving end surface 352 of the waveguide 35.

The width $W_{SC}$ of the spot-size converter 43 at the light-receiving end surface 430 may be in the range of approximately 1 to 10 μm, for example. The spot-size converter 43 is made of a material with a refractive index higher than the refractive index $n_{OC}$ of the constituent material of the surrounding overcoat layer 38. The spot-size converter 43 can be formed from the same dielectric material as the waveguide 35, which will be described below. In the case, the spot-size converter 43 and the waveguide 35 may be formed integrally.

The waveguide 35 in the present embodiment extends in parallel with the element-integration surface 2202 from the light-receiving end surface 352 that receives laser light emitted from the spot-size converter 43 to the end surface 350 on the head end surface 2210 side. Here, the end surface 350 may be a portion of the head end surface 2210, or may be recessed from the head end surface 2210 with a predetermined distance. A portion of one side surface of the waveguide 35 near the end surface 350 faces a NF-light generator 36. This allows laser light (waveguide light) incident through the light-receiving end surface 352 and traveling through the waveguide 35 to reach the portion facing the NF-light generator 36, thereby to be coupled with the generator 36.

Referring again to FIG. 1, a pair of terminal electrodes 370 and a pair of terminal electrodes 371 for the magnetic head element 32 are provided on the upper surface of the overcoat layer 38 of the slider 22. The terminal electrodes 370 and 371 are electrically connected to connection pads of wiring members provided in an HGA 17 (FIG. 9) by wire bonding method or SBB method. A mode of the connection between these terminal electrodes and the wiring members on the flexure 201 will also be described later in detail.

The slider substrate 220 may be, for example, a so-called Femto slider having a thickness (in X-axis direction) $T_{SL}$ of 230 μm, a width $W_{SL}$ of 700 μm in the track width direction (Y-axis direction), and a length $L_{SL}$ (in Z-axis direction) of 850 μm. The Femto slider is generally used as a substrate for thin-film magnetic heads capable of high-density recording, and has the smallest standardized size of all the sliders currently on the market. The slider substrate 220 can be formed of a ceramic material such as AlTiC ($Al_2O_3$—TiC) or $SiO_2$.
(Thermally-Assisted Magnetic Recording Head)

As described above, the thermally-assisted magnetic recording head 21 has a "composite slider structure" in which the slider 22 and the light source unit 23 are bonded to be joined. Thus, the slider 22 and the light source unit 23 can be separately fabricated and then joined together to fabricate the head 21. Consequently, if performance and reliability evaluations of the light source units 23 and the sliders 22 are performed prior to the fabrication of the heads and only good light source units 23 and good sliders 22 are used for the fabrication of the heads, significantly adverse influence to the production yield of heads 21 in the head manufacturing process due to the rejection rates of light-source units 23 and sliders 22 can be avoided.

In fabricating the thermally-assisted magnetic recording head with the "composite slider structure", it is significantly important to appropriately join the light source unit 23 and the slider 22. Specifically, it is essential to provide a sufficiently strong junction, to ensure a sufficiently high accuracy of joining position, and to provide a heat dissipation path for the laser diode 40 after the joining. There will be explained later, with reference to FIGS. 7a1 to 7j, a method for manufacturing the thermally-assisted magnetic recording head 21 according to the present invention, which meets the above-described requirements.

FIG. 2 shows a cross-sectional view taken by plane A in FIG. 1, schematically illustrating the structures of the head element part 221 of the slider 22, the laser diode 40 of the light source unit 23, and their vicinities in the thermally-assisted magnetic recording head 21.
(Laser Diode)

According to FIG. 2, the laser diode 40 is of edge-emitting type. As the laser diode 40, InP base, GaAs base or GaN base diodes can be utilized, which are usually used for communication, optical disk storage, or material analysis. The wavelength $\lambda_L$ of the emitted laser light may be, for example, in the range of approximately 375 nm to 1.7 μm. The laser diode 40 shown in FIG. 2 has a multilayered structure in which, from the upper surface side, sequentially stacked is: an n-electrode 40a; an n-GaAs substrate 40b; an n-InGaAlP clad layer 40c; the first InGaAlP guide layer 40d; an active layer 40e formed of multiquantum well (InGaP/InGaAlP) or the like; the second InGaAlP guide layer 40f; an p-InGaAlP clad layer 40g; a p-electrode base layer 40h; and a p-electrode 40i. Further, on the front and rear cleaved surfaces of the multilayered structure of the laser diode 40, respectively formed are reflective layers 510 and 511 for exciting the oscillation by total reflection. Here, the light-emission center 4000 exists at the position of the active layer 40e on the reflective layer 510. In the present embodiment, the n-electrode 40a can be a layer made of, for example, Au or Au alloy with a thickness of approximately 0.1 μm and formed on the n-GaAs substrate 40b.

Of course, the structure of the laser diode 40 is not limited to the above-described one. However, the laser diode 40 is preferably disposed in such a manner that the p-electrode 40i is positioned at the bottom and is bonded to the light-source electrode 410. In edge-emitting laser diodes in general, the active layer 40e (light-emission center 4000) is closer to the p-electrode 40i than the n-electrode 40a in the direction in which the layers are stacked (in Z-axis direction). Accordingly, by setting the laser diode 40 with its p-electrode 40i as a bottom, the p-electrode 40i being closer to the active layer 40e that generates most amount of heat during operation, the unit substrate 230 can more effectively function as a heatsink of the light source. In fact, the appropriate disposal of heat generated from the laser diode 40 is very important for maintaining the oscillation operations of the laser diode 40 in good working order.

Further, an electric source provided within the magnetic disk apparatus can be used for driving the laser diode 40. In fact, the magnetic disk drive apparatus usually has an electric source with applying voltage of, for example, approximately 2 to 5V, which is sufficient for the laser oscillation. The laser diode 40 may have a width $W_{LA}$ (FIG. 1) in the track width direction (in Y-axis direction) lager than the width $W_{UN}$ of the unit substrate 230. The length $L_{LA}$ of the laser diode 40 corresponds approximately to a cavity length that is the distance between the reflective layers 510 and 511, and is preferably 300 μm or more in order to obtain a sufficient high output. Further, the p-electrode 40i of the laser diode 40 and the light-source electrode 410 of the unit substrate 230 can be bonded to each other by soldering using a solder such as Au—Sn alloy.

(Head Element Part)

As shown also in FIG. 2, the head element part 221 includes an MR element 33 and an electromagnetic transducer 34 and an optical system 31.

The MR element 33 is formed on a base layer 380 that is formed of an insulating material such as $Al_2O_3$ (alumina), $SiO_2$ and stacked on the element-integration surface 2202. The MR element 33 includes: an MR multilayer 332; and a lower shield layer 330 and an upper shield layer 334 which are formed of a soft-magnetic material and sandwich the MR multilayer 332 and an insulating layer 381 therebetween. The MR multilayer 332 is a magneto-sensitive part for detecting signal magnetic field by utilizing MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect.

The electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk 10 (FIG. 8), the magnetic flux being excited by write current flowing through the write coil layer 343. The main magnetic pole 3400 has an end surface 3400e with a small width $W_p$ (FIG. 3) in the track width direction, the end surface 3400e reaching the head end surface 2210. The width $W_P$ defines the width of distribution of write field WF in the track width direction (Y-axis direction), and can be set to be, for example, 0.05 to 0.5 μm. The main magnetic pole 3400 is preferably formed of a soft-magnetic material with a saturation magnetic flux density higher than that of the upper yoke layer 340, which is, for example, an iron alloy containing Fe as a main component.

The write coil layer 343 is formed on an insulating layer 385 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment; however, may have a two or more layered structure or a helical coil shape. Further, the number of turns of the write coil layer 343 is not limited to that shown in FIG. 2, and may be, for example, in the range from two to seven.

The back contact portion 3402 has a through-hole extending in X-axis direction, and the waveguide 35 and insulating layers that covers the waveguide 35 pass through the through-hole. In the through-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 345 is formed of a soft-magnetic material. Further, the lower shield 3450 is a part of the magnetic path, being connected with the lower yoke layer 345 and reaching the head end surface 2210. The lower shield 3450 is opposed to the main magnetic pole 3400 through the NF-light generator 36, and acts for receiving the magnetic flux spreading from the main magnetic pole 3400. The lower shield 3450 is preferably formed of a material with high saturation magnetic flux density such as NiFe (Permalloy) or an iron alloy as the main magnetic pole 3400 is formed of. Here, the insulating layers 381, 382, 383, 384, 385 and 386 constitute the overcoat layer 38.

Referring also to FIG. 2, the optical system 31 includes a spot-size converter 43, a waveguide 35 and a NF-light generator 36.

Laser light 53, the spot size of which the spot-size converter 43 changes (reduces), enters the waveguide 35 from the light-receiving end surface 352, and propagates through the waveguide 35. The waveguide 35 extends from the light-receiving end surface 352 to the end surface 350 on the head end surface 2210 side through the through-hole that is provided in the back contact portion 3402 and extends in X-axis direction. Furthermore, the NF-light generator 36 is an element that transforms the laser light (waveguide light) 53 propagating through the waveguide 35 into NF-light. A part on the head end surface 2210 side of the waveguide 35 and the NF-light generator 36 are provided between the lower shield 3450 (lower yoke layer 345) and the main magnetic pole 3400 (upper yoke layer 340). Further explanation for the above-described optical system 31 will follow with reference to FIG. 3.

Figure 3:
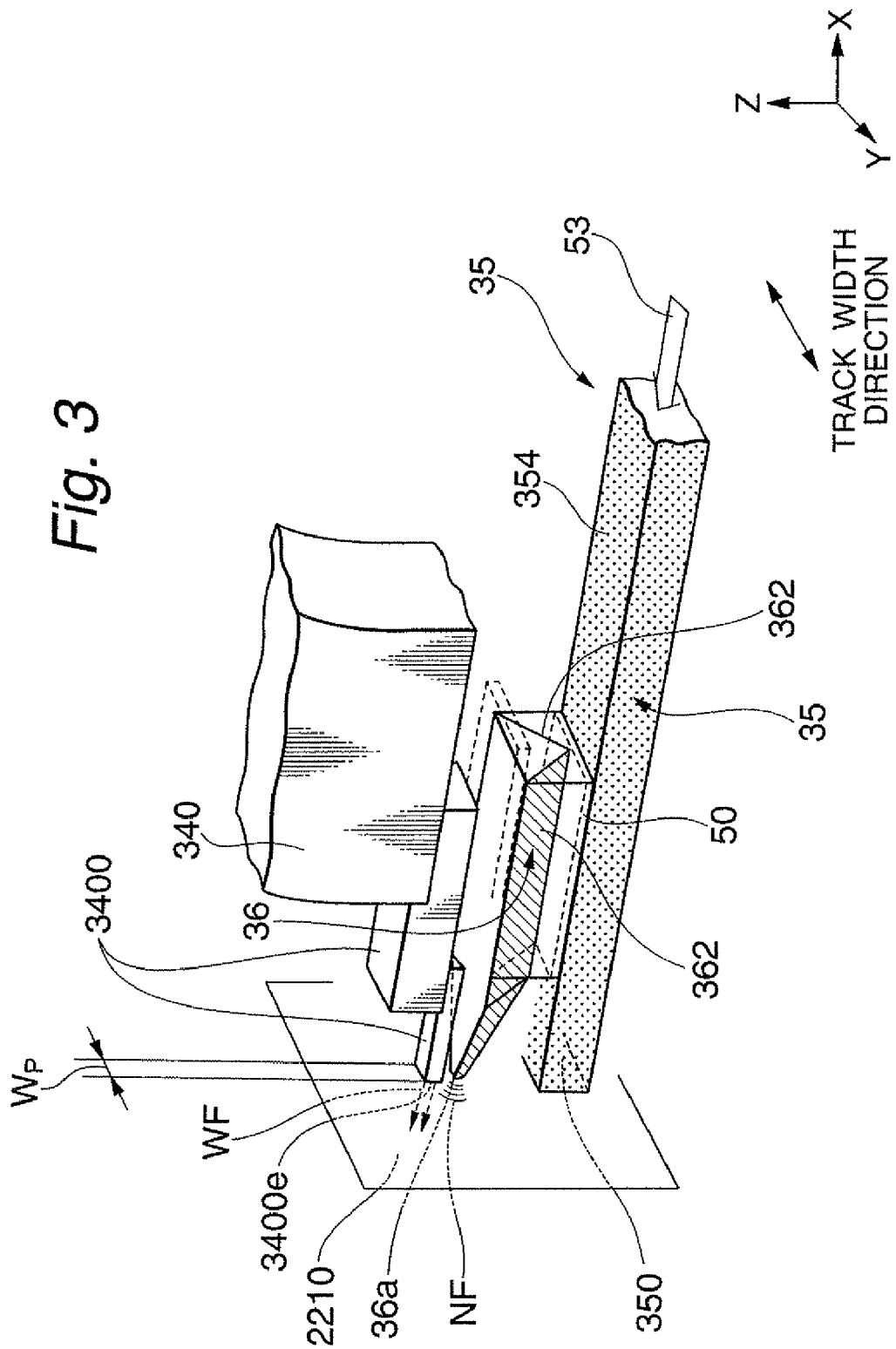
FIG. 3 shows a perspective view schematically illustrating the configuration of the waveguide, the near-field light generator and the main magnetic pole.

FIG. 3 shows a perspective view schematically illustrating the configuration of the waveguide 35, the NF-light generator 36 and the main magnetic pole 3400. In the figure, the head end surface 2210 is positioned at the left side, the surface 2210 including positions where write field and NF-light are emitted toward the magnetic recording medium.

As shown in FIG. 3, the configuration includes the waveguide 35 for propagating laser light (waveguide light) 53 used for generating NF-light toward the end surface 350, and the NF-light generator 36 that receives the waveguide light 53 and generates NF-light NF. Further, a buffering portion 50 is a portion sandwiched between a portion of the side surface 354 of the waveguide 35 and a portion of the lower surface 362 of the NF-light generator 36. The buffering portion 50 is formed of, for example, a dielectric material that has a refractive index lower than that of the waveguide 35, and acts for coupling the waveguide light 53 with the Nf-light generator 36. In the light source and optical system as shown in FIGS. 1 to 3, the laser light emitted from the light-emission surface 400 of the laser diode 40 preferably has TM-mode polarization in which the oscillation direction of electric field of the laser light is along Z-axis.

Further, as also shown in FIG. 3, the NF-light generator 36 is, in the present embodiment, formed of a metal such as Au, Ag, or an alloy including Au or Ag, and has a cross-section taken by YZ-plane with a triangular shape. The end surface 36a, which reaches the head end surface 2210, especially has an isosceles triangle shape that has one apex on the leading side (−Z side) opposed to the bottom edge. The NF-light generator 36 converts the waveguide light 53 propagating through the waveguide 35 into NF-light, and emits NF-light NF from the end surface 36a. The NF-light NF is emitted toward the magnetic recording layer of the magnetic disk 10 (FIG. 8), and reaches the surface of the magnetic disk 10 to heat a portion of the magnetic recording layer of the disk 10. This heating reduces the anisotropic magnetic field (coercive force) of the portion to a value with which write operation can be performed. Immediately after the heating, write field WF generated from the main magnetic pole 3400 is applied to the portion to perform write operation. Thus, the thermally-assisted magnetic recording can be accomplished.

The optical system that is provided in the head element part 221 and generates light for thermal assist is not limited to the above-described one. For example, as an alternative, there can be available an optical system that use a NF-light generator having another shape and structure, or an optical system in which a plasmon antenna made of a metal piece is provided at the end of a waveguide.

Figure 4:
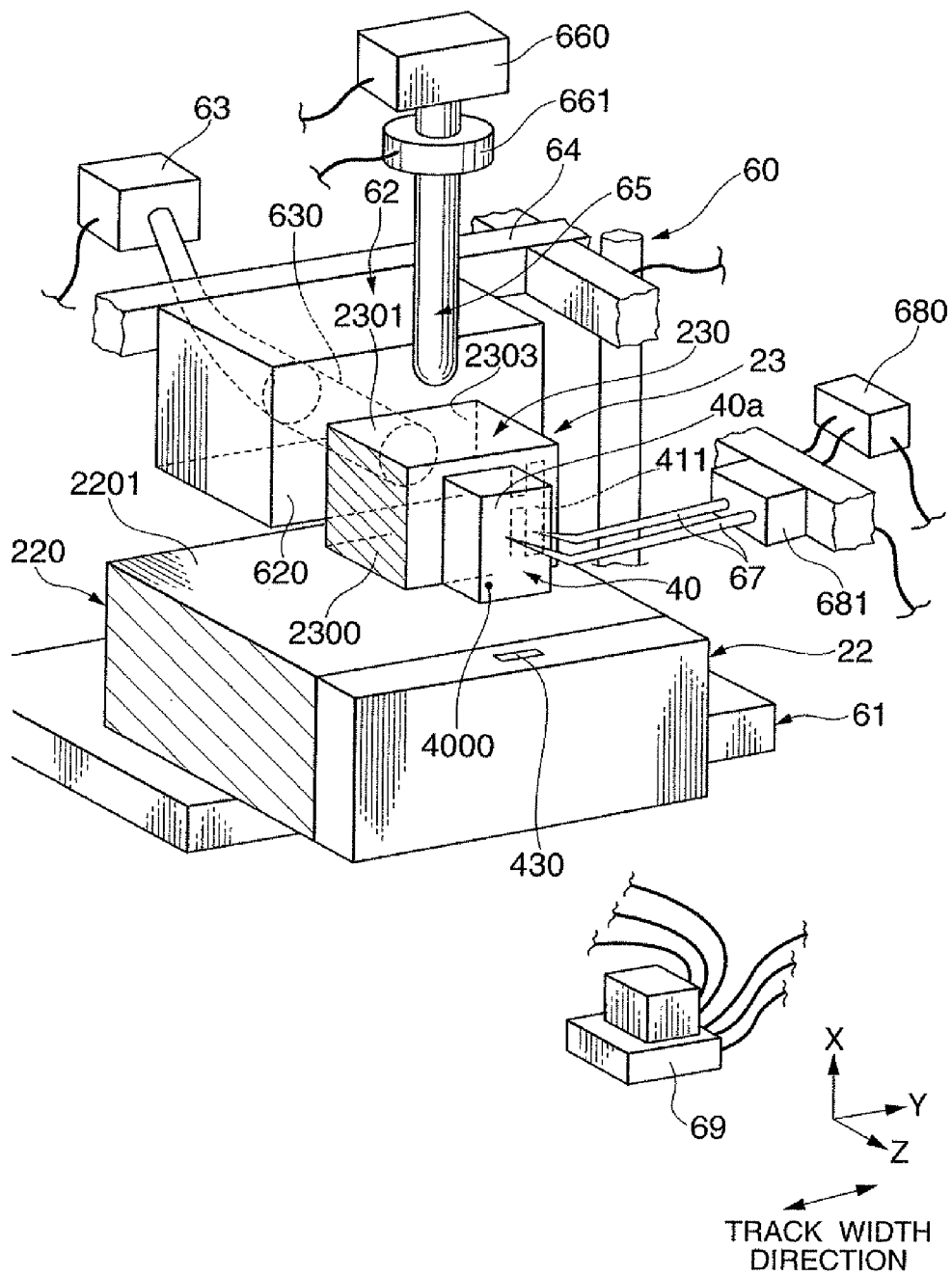
FIG. 4 shows a perspective view schematically illustrating a configuration of a principal part in one embodiment of a joining apparatus for joining the light source unit and the slider by the method for manufacturing the thermally-assisted magnetic recording head according to the present invention.

FIG. 4 shows a perspective view schematically illustrating a configuration of a principal part in one embodiment of a joining apparatus for joining the light source unit 23 and the slider 22 by the method for manufacturing the thermally-assisted magnetic recording head according to the present invention.

Referring to FIG. 4, a joining apparatus 60 for joining the light source unit 23 to the slider 22 includes: a stage 61 which is a fixture for supporting the slider 22; a back holding jig 62 having at least one suction hole 630 which is suction means for attracting the light source unit 23 by suction; a round-tipped rod 65 which is loading means for applying a load to the load application surface 2301 of the unit substrate 230; and probes 67 which are to be pressed against electrodes for the laser diode 40 provided in the light source unit 23 to supply electric power to the laser diode 40.

The joining apparatus 60 further includes a controller 69. The controller 69 controls the movement of the back holding jig 62 through a back-holding-jig drive unit 64, controls suction by the suction hole 630 through an evacuator 63, controls application of load by the round-tipped rod 65 through a loading unit 660 and a load cell 661, controls movement of the probes 67 through a probe drive unit 681, and controls power supply to the laser diode 40 through an active-alignment power supply 680 and the probes 67, as appropriate. The controller 69 may be a computer including software and a recording medium for appropriately providing the controls described above.

The back holding jig 62 includes a suction surface 620 which contacts the unit back surface 2303 of the unit substrate 230. The suction hole 630 passes through the back holding jig 62. One end of the suction hole 630 reaches the suction surface 620, and the other end connects to the evacuator 63. Since the back holding jig 62 covers only the unit back surface 2303 of the light source unit 23, the light source unit 23 attached to the back holding jig 62 can be readily accessed externally by various jigs and devices. The back holding jig 62 is connected to the back-holding-jig drive unit 64 and can be moved to adjust the relative position of the light source unit 23 with respect to the slider 22 held on the stage 61.

Referring to FIG. 4, the round-tipped rod 65 has a spherical or convex tip which presses and applies load to the light source unit 23. The round-tipped rod 65 is connected to the loading unit 660 and the load cell 661 which is a weight sensor. The round-tipped rod 65 applies a predetermined load to the load application surface 2301 of the unit substrate 230. The load application surface 2301 is the upper surface of the unit substrate 230 that is opposite to the joining surface 2300. The round-tipped rod 65 may be replaced with alternative loading means such as a rod having a minute tip surface such as a frustum of a triangular pyramid, a frustum of a quadrangular pyramid or a frustum of a cone.

The probes 67 are metal needles used for performing active alignment. The probes 67 are electrically connected to the active-alignment power supply 680. One of the probes 67 in the present embodiment is pressed against a lead electrode 411 provided on the source-installation surface 2302 of the light source unit 23 and the other to an n-electrode 40a, which is the upper surface of the laser diode 40, to supply electric power to the laser diode 40. In the active alignment, the light-emitting center 4000 of the laser diode 40 and the light-receiving end surface 430 of the optical system 31 are aligned with each other in directions in the plane of the slider back surface 2201 (directions in YZ-plane). Therefore, the probes 67, which are connected to the probe drive unit 681, are movable so that the probe 67 on the electrode of the laser diode 40 can remain pressed against the electrode during the alignment.

Figure 5:
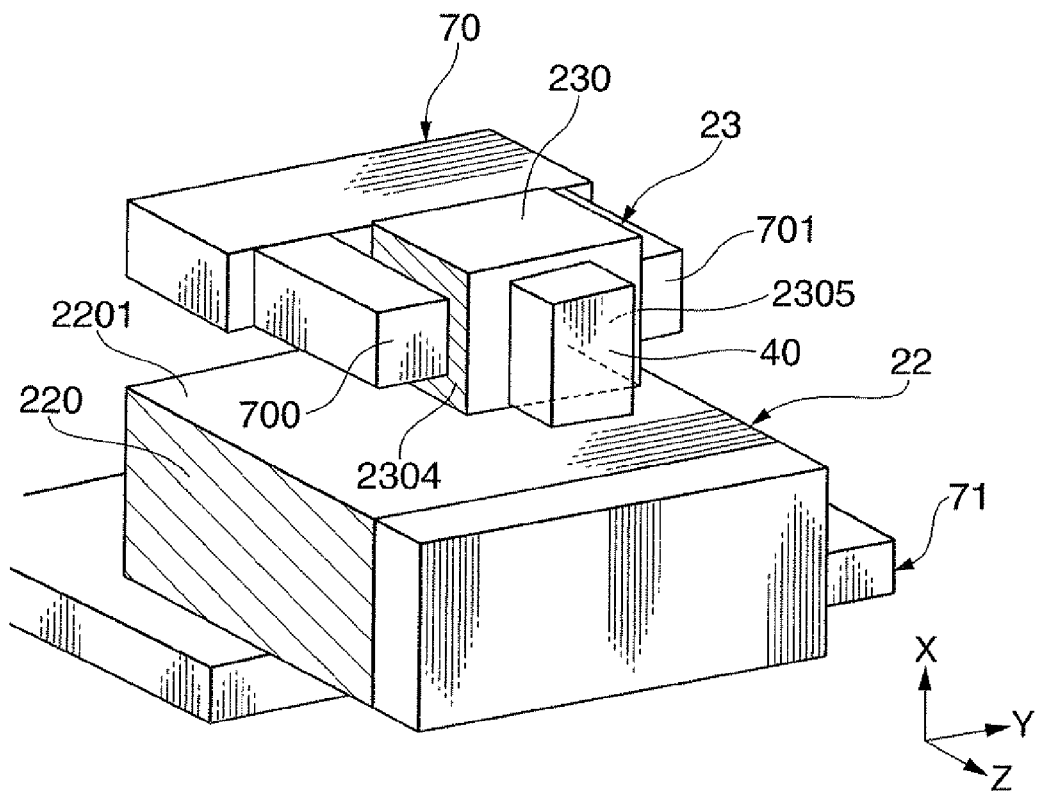
FIG. 5 shows a perspective view schematically illustrating a comparative example for comparison with the mechanism for holding the light source unit in the joining apparatus according to the present invention illustrated in FIG. 4.
Figure 6:
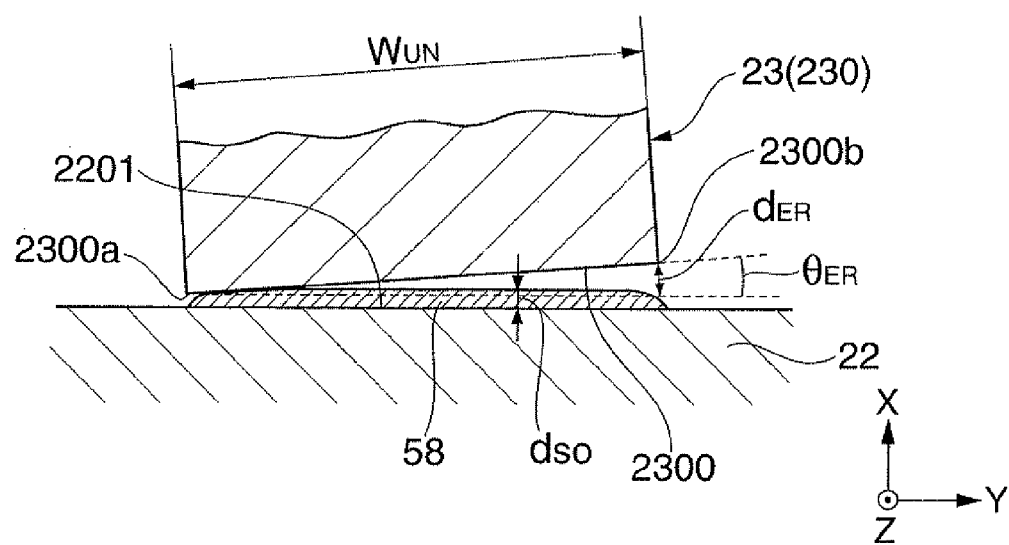
FIG. 6 shows a schematic view illustrating junction between the joining surface of a light source unit and the slider back surface of a slider when the "conformity" between both surfaces is inadequate.

FIG. 5 shows a perspective view schematically illustrating a comparative example for comparison with the mechanism for holding the light source unit 23 in the joining apparatus 60 according to the present invention illustrated in FIG. 4. FIG. 6 shows a schematic view illustrating junction between the joining surface 2300 of a light source unit 23 and the slider back surface 2201 of a slider 22 when the "conformity" between both surfaces is inadequate. The term "conformity" as used here means the degree of parallelism of a surface to a reference surface, or the degree to which a surface conforms to a reference surface.

Referring to FIG. 5, a clamp 70 holds the light source unit 23 in the comparative example. Specifically, two arms 700 and 701 of the clamp 70 sandwich the light source unit 23 in such a manner that the arms 700 and 701 are in contact with two side surfaces 2304 and 2305 of the light source unit 23 that are opposite to each other in the track width direction (in Y-axis direction). Accordingly, the light source unit 23 is unable to rotate about Z-axis with respect to the clamp 70. The surfaces of the unit substrate 230 of the light source unit 23 have errors in squareness to each other due to working accuracy limitations. The surfaces of the arms 700 and 701 of the clamp 70 that sandwich the light source unit 23 also have errors in squareness to each other. Movement of the clamp 70 with respect to the stage 71 also has an error due to adjustment limitations. It will be understood from the foregoing that it is difficult to maintain a high conformity between the joining surface 2300 of the light source unit 23 and the slider back surface 2201 of the slider 22 even if errors in position and orientation of the clamp 70 with respect to the stage 71 are minimized and then the clamp 70 is brought close to the stage 71 to bring the light source unit 23 into contact with the slider 22.

Junction between the joining surface 2300 of the light source unit 23 and the slider back surface 2201 of the slider 22 when the conformity between the joining surface 2300 and the slider back surface 2201 is inadequate will be described with reference to FIG. 6.

Suppose that the light source unit 23 (unit substrate 230) having a width $W_{UN}$ in the track width direction (in Y-axis direction) of 500 μm is joined to the slider 22 as illustrated in FIG. 6. It is assumed here that a solder layer 58 has been provided on the slider back surface 2201 of the slider 22 and the thickness $d_{ER}$ of the solder layer 58 is 2 μm. It is undesirable to have the thickness $d_{ER}$ of the solder layer 58 too large, for example greater than 2 μm. If the solder layer 58 is too thick, the distance between the light source unit 23 and the slider 22 will be so large that light emitted from the laser diode 40 can significantly attenuate before reaching an optical system in the slider 22, resulting in a significantly reduced light use efficiency of the head. In addition, the solder layer 58 can undesirably flow into the space between the laser diode 40 and the optical system.

If alignment between the joining surface 2300 of the light source unit 23 and the slider back surface 2201 of the slider 22 is completed with the joining surface 2300 of the light source unit 23 being tilted at a small angle $\theta_{ER}$ of 0.5° (degrees) to the slider back surface 2201 of the slider 22 before joining and then the solder is melted to complete the joining, one end 2300a of the joining surface 2300 of the light source unit 23 is adhered to the slider back surface 2201 by the solder layer 58 whereas the other end 2300b is a distance $d_{ER}$ of 4.4 μM further apart from the slider back surface 2201 in +X direction as compared with the end 2300a. Even if the solder layer 58 is 2 μm thick, a gap is formed between a region of the joining surface 2300 near the end 2300b and the slider back surface 2201 due to the tilt at an angle $\theta_{ER}$ of as small as 0.5°. As a result, the strength of the joining can be unacceptably decreased. If the joining is weak, the light source unit 23 can become detached from the slider 22 during a subsequent process step such as a cleaning step, or during use of the head.

FIGS. 7a1 to 7j show schematic views illustrating one embodiment of the method for manufacturing the thermally-assisted magnetic recording head 21 in which a light source unit 23 is joined to a slider 22 according to the present invention. For clarity, a solder layer 58 provided on the slider back surface 2201 of the slider 22 is omitted from FIGS. 7a1 to 7h and FIG. 7j.

Referring to FIGS. 7a1 and 7a2, first the light source unit 23 is held with a back holding jig 62 having at least one suction hole 630 which reaches a suction surface 620 of the back holding jig 62. Specifically, the unit back surface 2303 of the light source unit 23 is adhered to the suction surface 620 of the back holding jig 62 by suction. The adhesion of the light source unit 23 by suction by the suction hole 630 is accomplished by activating an evacuator 63 connected to one end of the suction hole 630 to decrease the air pressure in the suction hole 630. Here, the force sucking the light source unit 23 depends on the inner diameter of the suction hole 630, the number of suction holes 630 provided, and the degree of evacuation by the evacuator 63, and can be adjusted in a considerable range. In the present embodiment, the suction force is adjusted to have a magnitude such that the position or orientation of the light source unit 23 is changed under a predetermined load applied. The adjustment enables effective adjustment of the conformity of the joining surface 2300 with the round-tipped rod 65 in a subsequent step.

The light source unit 23 is adhered in a position such that its joining surface 2300 is positioned below (on −X side of) the lower surface 621 of the back holding jig 62. This positioning allows the light source unit 23 to come into contact with the slider 22 while preventing the back holding jig 62 from contacting the slider 22 when the back holding jig 62 is brought close to the slider 22. Here, the joining surface 2300 does not need to be brought into parallelism with the lower surface 621 when the light source unit 23 is sucked. This is because the conformity of the joining surface 2300 will be adjusted by application of a load by the round-tipped rod 65 in a subsequent step. Consequently, the step of holding the light source unit 23 with the back holding jig 62 can be relatively readily completed in a short time.

Figure 7B:
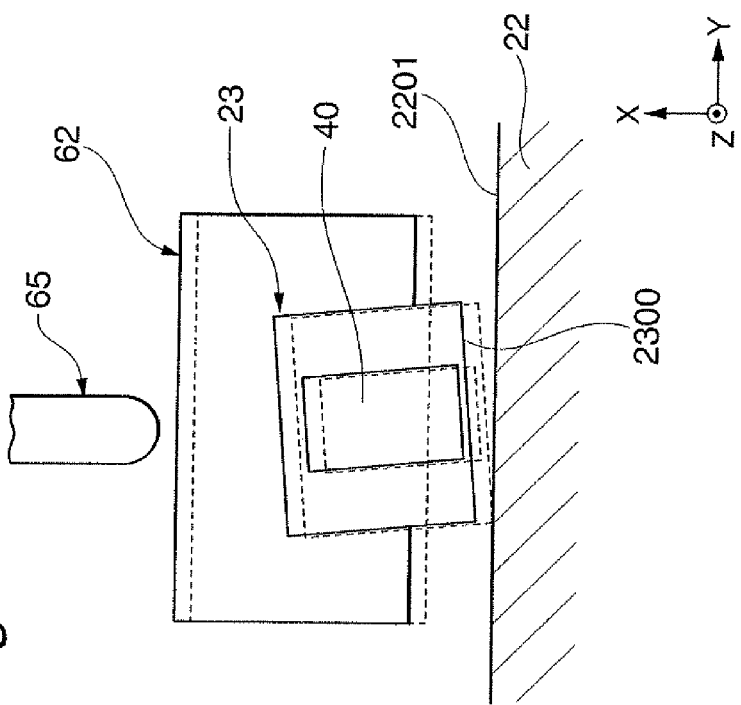
Figure 7B:
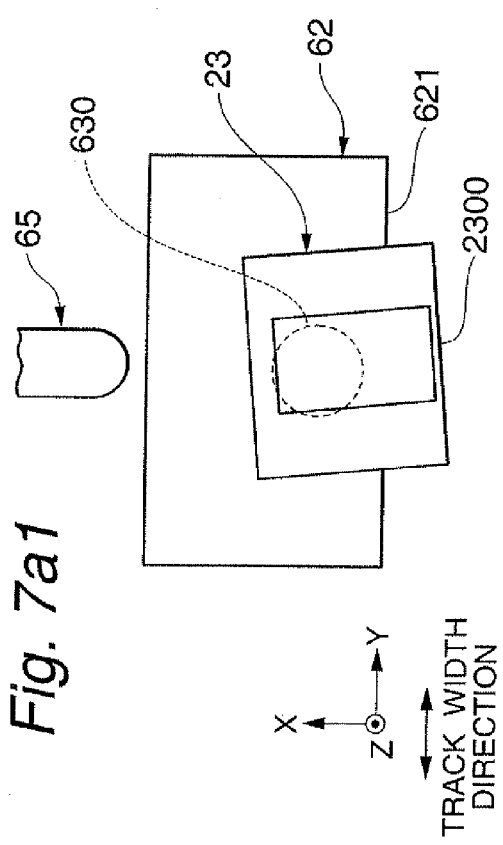
Figure 7B:
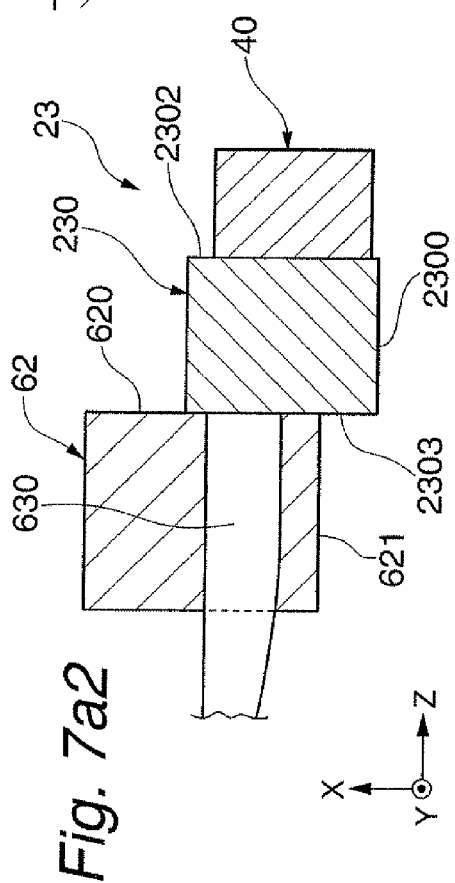
Figure 7C:
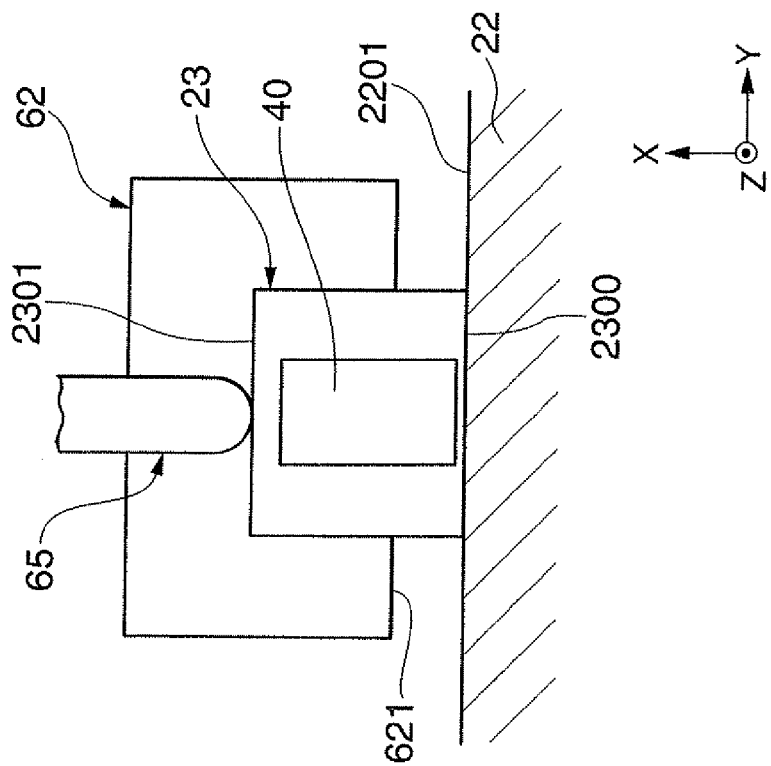

Then the back holding jig 62 is moved close to the slider 22 to bring the light source unit 23 adhered to the back holding jig 62 by suction close to or into contact with the slider back surface 2201 of the slider 22 as illustrated in FIG. 7b. The back holding jig 62 is then brought closer to the slider 22 until the distance between the lower surface 621 of the back holding jig 62 and the slider back surface 2201 reaches a predetermined value, for example several tens of μm, thereby pressing the light source unit 23 against the slider 22 as illustrated in FIG. 7c. The pressing does not necessarily provide an adequate conformity of the joining surface 2300 of the light source unit 23 to the slider back surface 2201. One surface of a component in general does not necessarily readily conform to a reference surface simply by pressing the surface against the reference surface.

Figure 7D:
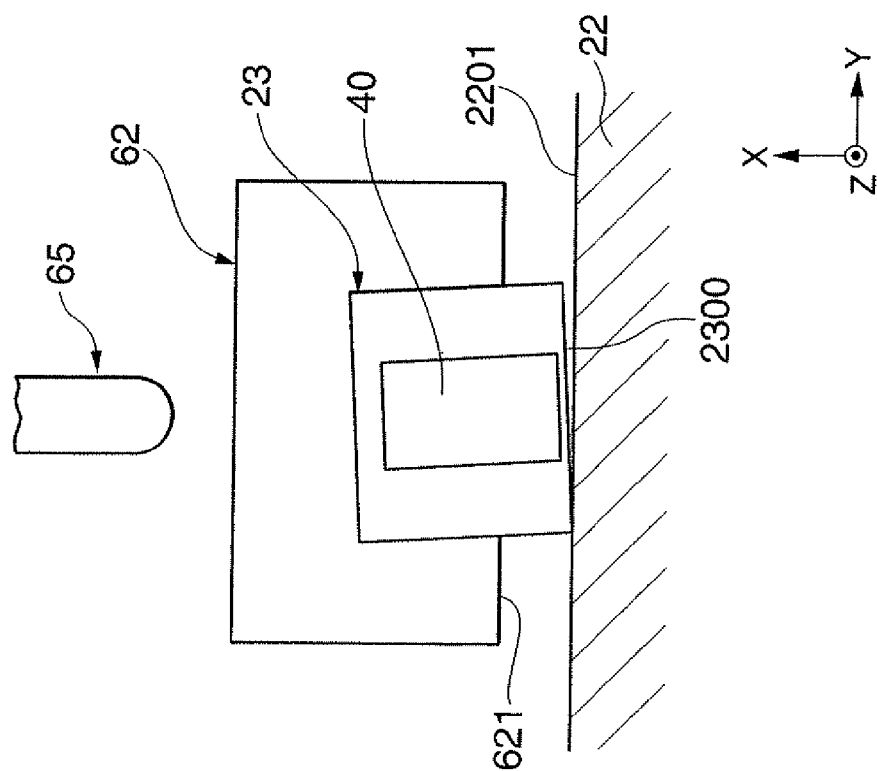

Then the round-tipped rod 65 is pressed against the load application surface 2301 of the light source unit 23 to apply a load to the light source unit 23 as illustrated in FIG. 7d. This load enables the joining surface 2300 of the light source unit 23 to conform to the slider back surface 2201 of the slider 22 at least in the track width direction (in Y-axis direction). At this stage, the joining surface 2300 conforms to the slider back surface 2201 in the direction along the track (in Z-axis direction) as well in the present embodiment. The area of contact of the round-tipped rod 65 with the load application surface 2301 is significantly smaller than the area of the joining surface 2300. Since the light source unit 23 is pressed by such a small contact area, the joining surface 2300 adequately conforms to the slider back surface 2201 in the process of being pressed against the slider back surface 2201 even if the joining surface 2300 is tilted at a small angle to the slider back surface 2201.

Here, the round-tipped rod 65 is connected to a loading unit 660 through a load cell 661 (FIG. 4) which is a weight sensor. This arrangement enables the magnitude of the load applied to the light source unit 23 to be adjusted to a proper value, for example a value in the range of 10 to 200 gf (grams-force), for achieving conformity. The suction force of the suction hole 630 with which the light source unit 23 is sucked has been adjusted so that the light source unit 23 is moved by a predetermined load applied to the light source unit 23 as has been described previously. Consequently, even though the back holding jig 62 stands still, the light source unit 23 can be moved by the pressure from the round-tipped rod 65 so that the joining surface 2300 can conform to the slider back surface 2201.

Then, as illustrated in FIG. 7e, the probes 67 are placed in contact with a lead electrode 411 provided on the source-installation surface 2302 of the light source unit 23 and an n-electrode 40 which forms the upper surface of the laser diode 40. Since the light source unit 23 is held at the back by the standing-still back holding jig 62, the light source unit 23 is not moved by the pressure from the probes 67 and the joining surface 2300 remains conformed to the slider back surface 2201. When the probes 67 are applied, the round-tipped rod 65 is preferably held pressed against the light source unit 23 to further ensure that the light source unit 23 is prevented from moving.

As illustrated in FIG. 7f, the round-tipped rod 65 is then raised to release the load from the light source unit 23 and the back holding jig 62 is moved away from the slider 22 to position the light source unit 23 at a predetermined distance $D_{US}$, for example several μm, from the slider 22. At this distance, the conformity of the joining surface 2300 of the light source unit 23 to the slider back surface 2201 in the track width direction (in Y-axis direction) is maintained high whereas the conformity in the direction along the track (in Z-axis direction) is low. This is because the light source unit 23 moves in the direction in which the light source unit 23 adheres again to the suction surface 620 of the back holding jig 62. The probes 67 follow the movement of the light source unit 23 and remain pressed against the lead electrode 411 and the n-electrode 40a.

Figure 7G:
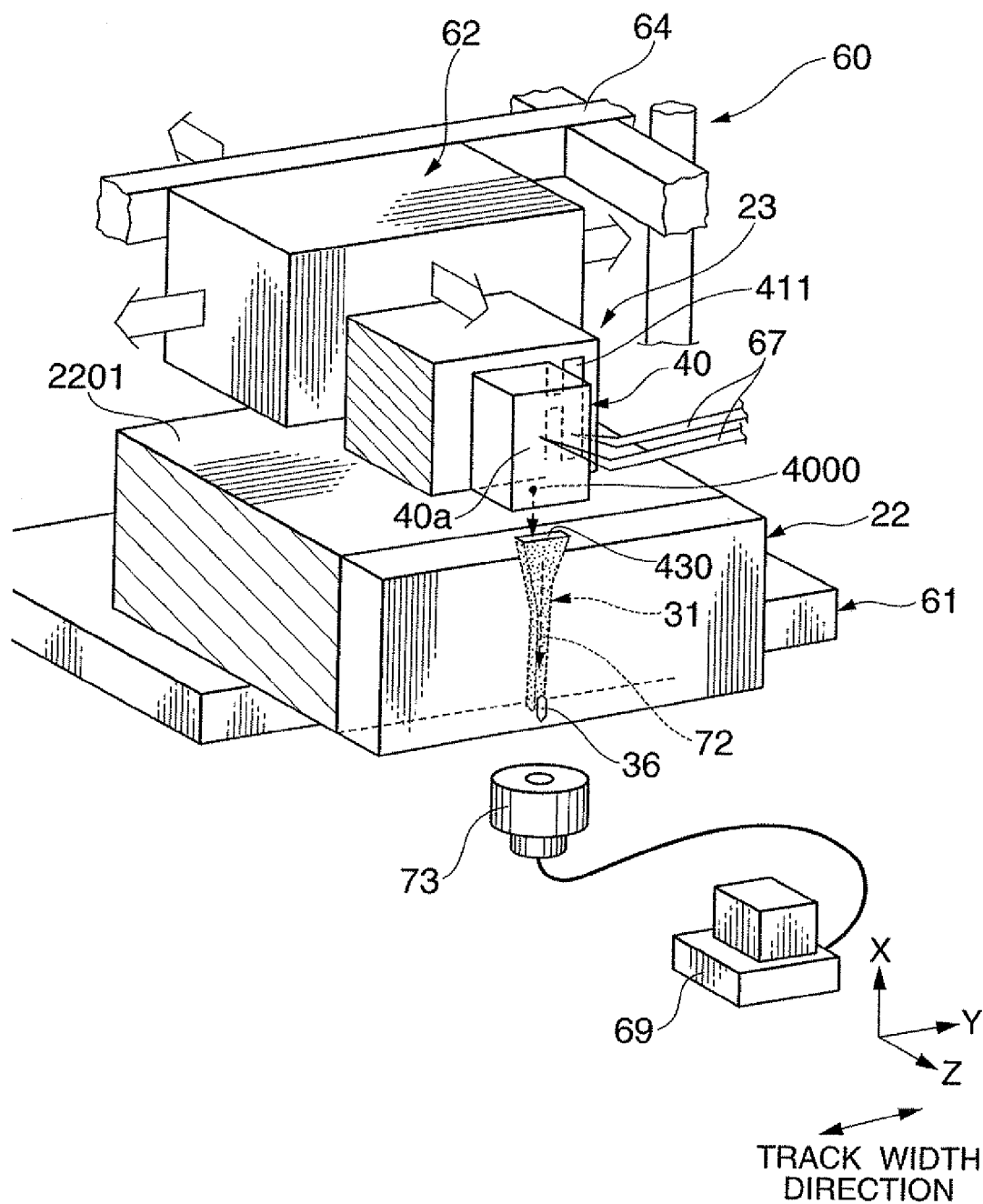

While the joining surface 2300 is in that conforming state, the light-emitting center 4000 of the laser diode 40 in the light source unit 23 is aligned with the light-receiving end surface 430 of the optical system 31 in the slider 22 in directions in the plane of the slider back surface 2201 (directions in YZ-plane) by active alignment as illustrated in FIG. 7g. Specifically, electric power is supplied to the laser diode 40 through the probes 67 to actually put the laser diode 40 in operation while the light source unit 23 (laser diode 40) is being moved with respect to the slider 22 (optical system 31). Then, while the light source unit 23 is being moved, laser light 72 emitted from the light-emitting center 4000 of the laser diode 40 and incident on the light-receiving end surface 430 of the optical system 31 is monitored on the light-emitting end side of the optical system 31 (on the end surface 36a side of the NF-light generator 36) in real time until the light intensity in the monitoring location is maximized, then the maximum intensity position is set as the desired relative position of the light source unit 23 (laser diode 40) with respect to the slider 22 (optical system 31). According to the active alignment, a desired light path can be actually reliably provided after joining and an extremely high accuracy in position of the junction between the light source unit 23 and the slider 22 can be achieved.

Laser light 72 emitted from the head end surface 2210 of the slider 22 or converted NF-light can be monitored in real time with a photodetector 73 such as a photodiode provided on the head end surface 2210 side of the slider 22. The photodetector 73 is connected to the controller 69 and the movement of the back holding jig 62 (light source unit 23) in YZ-plane can be controlled on the basis of a monitor output from the photodetector 73.

During the alignment described above, the laser diode 40 keeps operating and radiating considerable heat. However, by making the back holding jig 62 of a metal that has a high thermal conductivity, such as stainless steel or Cu (copper) and using the back holding jig 62 also as a heatsink, considerable heat radiated from the laser diode 40 can be dissipated through the unit substrate 230. Consequently, oscillation of the laser diode 40 is stabilized and the good active alignment can be achieved.

After completion of the alignment of the light source unit 23 and the slider 22, the back holding jig 62 is moved in −X direction closer to the slider 22 to move the light source unit 23 back toward the slider 22 by the distance $D_{US}$ over which the light source unit 23 has been moved in the step in FIG. 7f, thereby bringing the light source unit 23 into contact with the slider 22 as illustrated in FIG. 7h. The operation does not change the relative position of the light source unit 23 with respect to the slider 22 in YZ-plane. Then the round-tipped rod 65 is pressed against the load application surface 2301 of the light source unit 23 to apply a load to the light source unit 23 again. The load may be in the range of 10 to 200 gf (grams force), for example. The application of the load enables the joining surface 2300 of the light source unit 23 to conform to the slider back surface 2201 of the slider 22 both in the track width direction (Y-axis direction) and the direction along the track (Z-axis direction).

Then as illustrated in FIG. 7i, a solder layer 58 provided on the slider back surface 2201 of the slider 22 is melted to join the light source unit 23 to the slider 22. Here, the light source unit 23 and the slider 22 have been aligned with each other in YZ-plane and then moved along X-axis direction to be attached to each other with the solder layer 58 between them. In the present embodiment, the solder layer 58 is irradiated, through the unit substrate 230, with light 74 that has a predetermined wavelength that passes through the unit substrate 230. The solder layer 58 is melted by the irradiation with the light 74 and then solidified to join the light source unit 23 to the slider 22. The place where the solder layer 58 is formed previously is not limited to the slider back surface 2201; the solder layer 58 may be formed previously on the joining surface 2300 of the light source unit 23 or on both of the slider back surface 2201 and the joining surface 2300.

The light 74 may be Nd-YAG laser light (with a wavelength of 1064 nm) emitted from an Nd-YAG laser oscillator 76, which is a light source for adhesion, through an optical fiber 75. Here, YAG is the name of a crystal having a garnet structure, made of a composite oxide ($Y_3Al_5O_{12}$) of Y (yttrium) and Al (aluminum). Nd-YAG laser light can be obtained by using a YAG crystal in which several percent of Y is replaced with Nd (neodymium) as the laser medium and is widely used in research, industrial, medical and other applications. If Nd-YAG laser light is used as the light 74, the unit substrate 230 is made of a material that has a transmittance higher than or equal to 50% at a wavelength of 1064 nm, such as Si (with a transmittance of 67%), GaAs (with a transmittance of 66%), or SiC (with a transmittance of 80%), so that the solder layer 58 can be irradiated with a sufficient amount of light 74 for melting through the unit substrate 230. The light 74 may be other type of laser light such as YAG laser light other than Nd-YAG laser light, solid-state laser light other than YAG laser light, or gas laser light such as carbon dioxide gas laser light. It is essential that light having a wavelength capable of passing through the unit substrate 230 and having output power required for melting the solder layer 58 is used or a unit substrate 230 made of a material capable of passing the wavelength of the light used is used. Preferably, the position and suction operation of the back holding jig 62 are maintained and the application of load with the round-tipped rod 65 is also continued during the step of the joining under irradiation with light 74.

The solder layer 58 is preferably made of an alloy having a melting point lower than 400° C. For example, if the solder layer 58 is made of an Au—Sn alloy (containing 20 wt. % of Sn), the melting point of the solder layer 58 will be approximately 280° C. Experiments have shown that irradiation of the solder layer 58 with Nd-YAG laser light 74 having light output power of 0.1 kW, a spot diameter of 100 μm, and a pulse width of 4 microseconds, for example, through the light source unit 23 melts the solder layer 58 sufficiently well enough to bond the light source unit 23 to the slider 22.

Figure 7J:
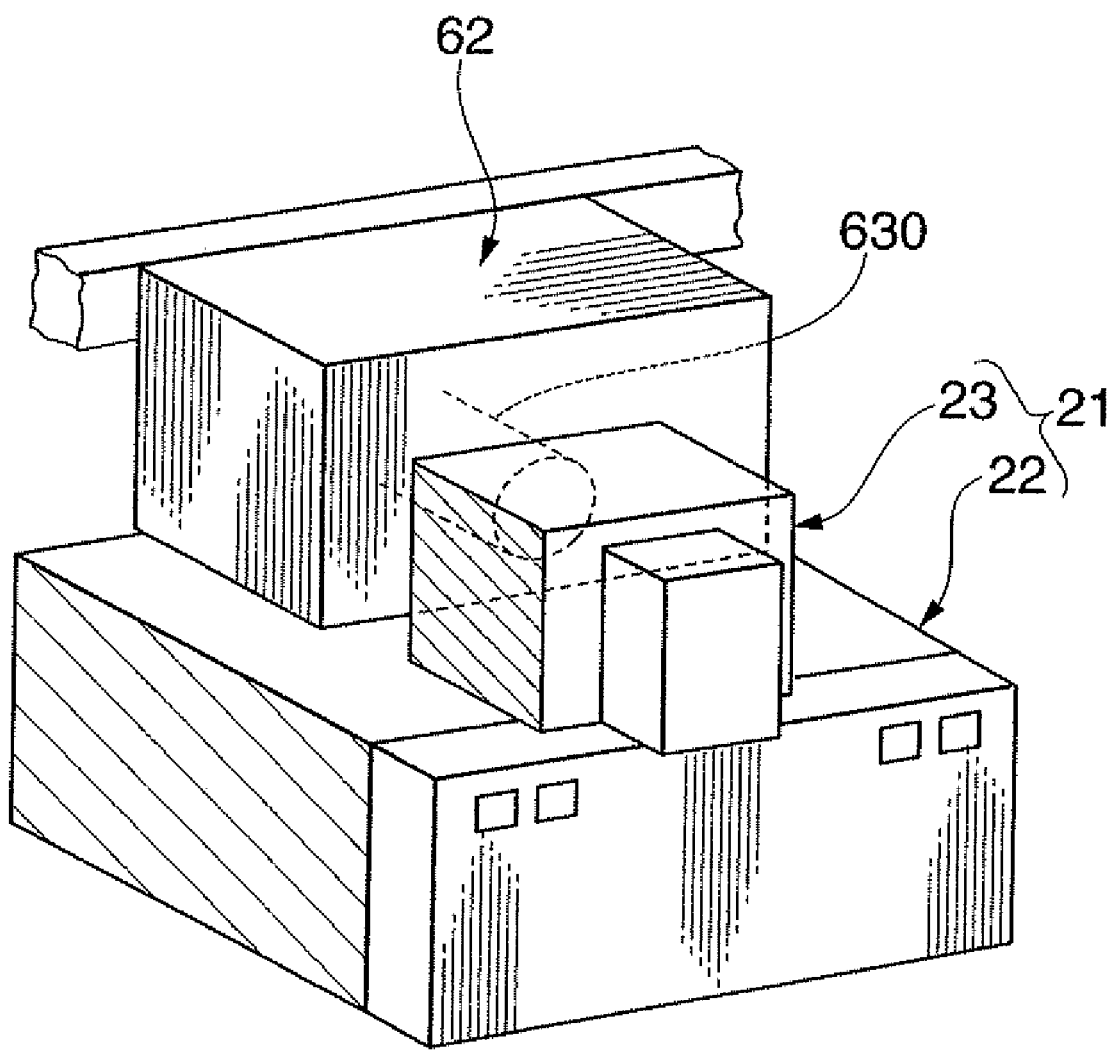

The adhesion of the light source unit 23 to the slider 22 with the solder layer 58 under irradiation with light 74 in this way completes the joining of the light source unit 23 to the slider 22. Thus, a thermally-assisted magnetic recording head 21 has been fabricated. In the head 21, the light source unit 23 and the slider 22 are joined together with the solder layer 58 between them. Consequently, a heat dissipation path through which heat radiated from the laser diode 40 in light-emitting operation is transferred sequentially to the unit substrate 230, to the solder layer 58, to the slider substrate 220 and to a magnetic recording medium, can be provided during write operations by the head 21 flying above the magnetic recording medium. The fabricated thermally-assisted magnetic recording head 21 can be transferred together with the back holding jig 62 to a working location where the next process step, for example a cleaning step, is performed, with the adhesion of the light source unit 23 to the back holding jig 62 by suction being maintained as illustrated in FIG. 7j.

According to the method for manufacturing the thermally-assisted magnetic recording head 21 according to the present invention described with reference to FIGS. 7a1 to 7j, the "conformity" between the joining surface 2300 of the light source unit 23 and the slider back surface 2201 of the slider 22 can be significantly increased while the light source unit 23 and the slider 22 can be aligned with each other by active alignment. Accordingly, an adequately strong junction and an adequately high accuracy of the joining position can be achieved in the joining between the light source unit and the slider. Furthermore, since the heat dissipation path for dissipating heat from the laser diode 40 after the joining can be provided, stable oscillation of the laser diode 40 can be provided and consequently a good thermal assist effect can be achieved.

Figure 8:
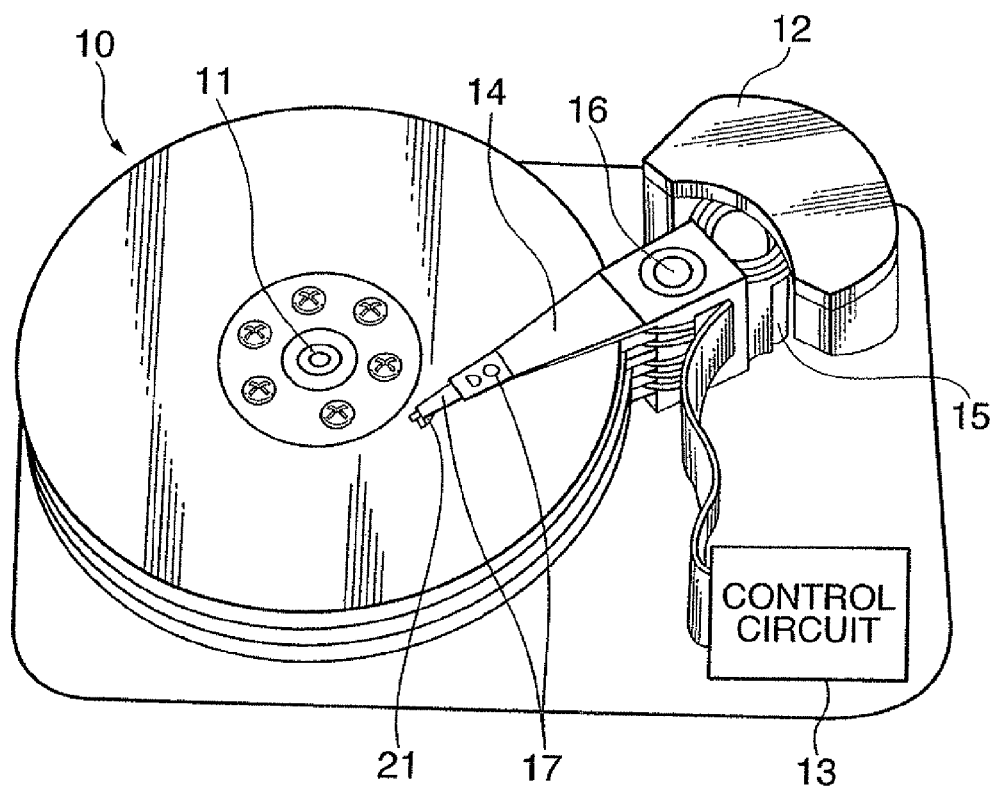
FIG. 8 shows a perspective view schematically illustrating a structure of a major part in one embodiment of a magnetic recording apparatus according to the present invention.
Figure 9:
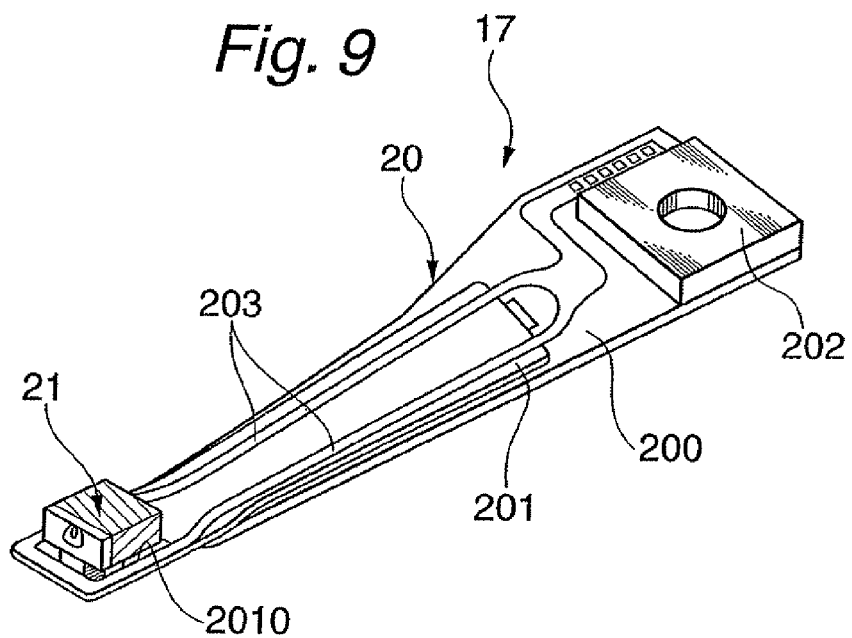
FIG. 9 shows a perspective view schematically illustrating a structure of a major part in one embodiment of an HGA according to the present invention.

FIG. 8 shows a perspective view schematically illustrating a structure of a major part in one embodiment of a magnetic recording apparatus according to the present invention. FIG. 9 shows a perspective view schematically illustrating a structure of a major part in one embodiment of an HGA according to the present invention. In FIG. 9, the side of the HGA opposed to the surface of the magnetic disk is presented as the upper side.

A magnetic disk apparatus as a magnetic recording apparatus shown in FIG. 8 includes: a plurality of magnetic disks 10 rotating around a rotational axis of a spindle motor 11; an assembly carriage device 12 provided with a plurality of drive arms 14 thereon; an HGA 17 attached on the top end portion of each drive arm 14 and provided with a thermally-assisted magnetic recording head 21; and a recording/reproducing and light-emission control circuit 13 for controlling write/read operations of the thermally-assisted magnetic recording head 21 and further for controlling the emission operation of a laser diode 40 as a light source that generates laser light for thermally-assisted magnetic recording.

The magnetic disk 10 is, in the present embodiment, designed for perpendicular magnetic recording, and has a structure in which, for example, sequentially stacked on a disk substrate is: a soft-magnetic under layer; an intermediate layer; and a magnetic recording layer (perpendicular magnetization layer). The assembly carriage device 12 is a device for positioning the thermally-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and sliders 21 may be one.

Referring to FIG. 9, a suspension 20 in the HGA 17 includes a load beam 200, a flexure 201 with elasticity fixed to the load beam 200, a base plate 202 provided on the base portion of the load beam 200, and a wiring member 203 provided on the flexure 201 and made up of lead conductors and connection pads electrically joined to both ends of the lead conductors. The thermally-assisted magnetic recording head 21 is fixed to the flexure 201 at the top end portion of the suspension 20 so as to face the surface of each magnetic disk 10 with a predetermined space (flying height). Here, an aperture 2010 is provided in the flexure 201; the thermally-assisted magnetic recording head 21 is fixed in such a way that the light source unit 23 protrudes from the opposite side of the flexure 201 through the aperture 2010.

Moreover, connection pads that form one end of the wiring member 203 are electrically connected to terminal electrodes 370 and 371 (FIG. 1) for the magnetic head element 32 of the thermally-assisted magnetic recording head 21, and further to the lead electrode 411 of the light source unit 23 and the n-electrode 40a (FIG. 1) of the laser diode 40 by wire bonding, SBB or the like. These connections enable the MR element 33, the electromagnetic transducer and the laser diode 40 to receive electric power and to be brought into operation. The structure of the suspension 20 is not limited to the above-described one. An IC chip for driving the head may be mounted midway on the suspension 20, though not shown.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A method for manufacturing a thermally-assisted magnetic recording head in which a light source unit including a light source provided in a unit substrate and a slider including an optical system provided in a slider substrate are joined to each other, the manufacturing method comprising the steps of:
   adhering by suction a unit back surface of the unit substrate with a back holding jig including a suction means, the unit back surface being opposite to a source-installation surface of the unit substrate;
   moving the back holding jig close to the slider to bring the light source unit adhered to the back holding jig by suction into contact with a slider back surface of the slider, the slider back surface being opposite to an opposed-to-medium surface of the slider and including a light-receiving end surface of the optical system;

applying a load to a load application surface of the unit substrate by a loading means to bring a joining surface of the light source unit into conformity with the slider back surface of the slider at least in a track width direction, the load application surface being opposite to the joining surface that is to be joined to the slider;

stopping applying the load, moving the back holding jig away from the slider to position the light source unit at a distance from the slider, and then aligning a light-emitting center of the light source with the light-receiving end surface of the optical system in directions in a plane of the slider back surface;

moving the back holding jig again close to the slider to bring the light source unit into contact with the slider back surface of the slider; and applying a load again to the load application surface of the unit substrate by the loading means to bring the joining surface of the light source unit into conformity with the slider back surface of the slider.

2. The manufacturing method as claimed in claim 1, wherein probes are brought into contact with electrodes for the light source provided in the light source unit, electric power is supplied to the light source to put the light source in emitting operation, and then the light-emitting center of the light source is aligned with the light-receiving end surface of the optical system so that a light from the light source enters the optical system.

3. The manufacturing method as claimed in claim 1, wherein a suction force of the suction means provided in the back holding jig, with which the light source unit is sucked, has a magnitude such that a position or orientation of the light source unit is changed under a predetermined load applied.

4. The manufacturing method as claimed in claim 1, wherein the suction means included in the back holding jig is at least one suction hole provided in the back holding jig, and the light source unit is adhered by suction to the back holding jig by activating an evacuator connected to one end of the at least one suction hole.

5. The manufacturing method as claimed in claim 1, wherein the loading means is a jig having a spherical or convex portion which is to contact with the load application surface of the unit substrate.

6. The manufacturing method as claimed in claim 1, further comprising the steps of:

forming an adhesion material layer previously on the joining surface of the light source unit or the slider back surface of the slider or on both of the surfaces, and bringing the joining surface into conformity with the slider back surface with the adhesion material layer sandwiched therebetween;

irradiating the adhesion material layer with a light that includes a wavelength that passes through the unit substrate through the unit substrate to melt the adhesion material layer; and bonding the light source unit and the slider.

7. A joining apparatus configured to join a light source unit and a slider, the joining apparatus comprising:

a fixture for supporting the slider;

a back holding jig comprising: a suction means for adhering the light source unit by suction; and a suction surface that is to contact with a unit back surface of a unit substrate, the back holding jig being capable of moving to adjust relative position of the light source unit with respect to the slider held in the fixture;

a loading means for applying a load to a load application surface of the unit substrate;

probes to be pressed against electrodes for a light source provided in the light source unit, provided for supplying electric power to the light source in order to align a light-emitting center of a light source with a light-receiving end surface of an optical system in directions in a plane of a slider back surface; and a controller configured to control movement of the back holding jig, suction by the suction means, application of load by the loading means, movement of the probes, and power supply to the light source through the probes, as appropriate.

8. The joining apparatus as claimed in claim 7, further comprising a photodetector for detecting a light that is emitted from the light source to which electric power is applied through the probes, propagated through the optical system, and emitted from an opposed-to-medium surface of the slider when aligning the light-emitting center of the light source with the light-receiving end surface of the optical system.

9. The joining apparatus as claimed in claim 7, wherein the suction means included in the back holding jig is at least one suction hole provided in the back holding jig, and one end of the at least one suction hole reaches the suction surface and the other end is connected to an evacuator.

10. The joining apparatus as claimed in claim 7, wherein the loading means is a jig having a spherical or convex portion which is to contact with the load application surface of the unit substrate.

11. The joining apparatus as claimed in claim 7, further comprising an adhesion light source for adhesion for irradiating an adhesion material layer with a light that includes a wavelength that passes through the unit substrate through the unit substrate, in order to melt the adhesion material layer and thus to bond the light source unit and the slider after forming the adhesion material layer previously on the joining surface of the light source unit or the slider back surface of the slider or on both of the surfaces and bringing the joining surface into conformity with the slider back surface with the adhesion material layer sandwiched therebetween.

* * * * *